United States Patent
Gheorghiu et al.

(10) Patent No.: US 11,272,510 B2
(45) Date of Patent: Mar. 8, 2022

(54) CHANNEL AND SYNC RASTER SIGNALING

(71) Applicant: QUALCOMM Incorporated, San Diego, CA (US)

(72) Inventors: Valentin Alexandru Gheorghiu, Tokyo (JP); Heechoon Lee, San Diego, CA (US); Marco Papaleo, Bologna (IT)

(73) Assignee: QUALCOMM Incorporated, San Diego, CA (US)

( * ) Notice: Subject to any disclaimer, the term of this patent is extended or adjusted under 35 U.S.C. 154(b) by 513 days.

(21) Appl. No.: 15/981,858

(22) Filed: May 16, 2018

(65) Prior Publication Data

US 2018/0338304 A1 Nov. 22, 2018

Related U.S. Application Data

(60) Provisional application No. 62/508,879, filed on May 19, 2017.

(51) Int. Cl.
*H04W 72/04* (2009.01)
*H04L 5/00* (2006.01)
(Continued)

(52) U.S. Cl.
CPC ......... *H04W 72/048* (2013.01); *H04L 5/0007* (2013.01); *H04L 5/0041* (2013.01);
(Continued)

(58) Field of Classification Search
None
See application file for complete search history.

(56) References Cited

U.S. PATENT DOCUMENTS

2010/0027492 A1\* 2/2010 Asanuma .......... H04W 72/0453
370/329
2013/0022003 A1 1/2013 Berggren et al.
(Continued)

FOREIGN PATENT DOCUMENTS

WO WO-2017039373 A1 3/2017

OTHER PUBLICATIONS

Ericsson: "NB-IoT-NB-MIB Content and Design Considerations", 3GPP TSG-RAN1#84, R1-160440, Feb. 14, 2016, XP051053776, Retrieved from the Internet: URL:http:ffwww.3gpp.org/ftp/Meetings_3GPP_SYNC/RAN1/Docs/, 4 pages.
(Continued)

*Primary Examiner* — Hassan A Phillips
*Assistant Examiner* — Gautam Sharma
(74) *Attorney, Agent, or Firm* — Holland & Hart LLP

(57) ABSTRACT

Methods, systems, and devices for wireless communication are described. A base station may identify a channel raster associated with a plurality of resource blocks of a channel. The plurality of resource blocks may have an asymmetric relation with respect to the channel raster. The base station may configure, based at least in part on the asymmetric relation, a message to indicate a resource block offset metric that comprises an indication of the channel raster and location information associated with a first resource block of the plurality of resource blocks. The base station may transmit the message to convey the indication of the resource block offset metric.

54 Claims, 16 Drawing Sheets

(51) Int. Cl.
*H04W 8/24* (2009.01)
*H04W 24/10* (2009.01)
*H04L 27/00* (2006.01)

(52) U.S. Cl.
CPC ............. *H04L 5/0091* (2013.01); *H04W 8/24* (2013.01); *H04L 5/001* (2013.01); *H04L 5/005* (2013.01); *H04L 27/0006* (2013.01); *H04W 24/10* (2013.01)

(56) References Cited

U.S. PATENT DOCUMENTS

| | | | |
|---|---|---|---|
| 2014/0126498 A1 | 5/2014 | Koorapaty et al. | |
| 2017/0223648 A1* | 8/2017 | Shin | H04J 11/0073 |
| 2017/0265156 A1* | 9/2017 | Xue | H04L 5/0092 |
| 2018/0048444 A1* | 2/2018 | Park | H04L 27/2613 |
| 2018/0302205 A1* | 10/2018 | Abedini | H04L 5/0053 |
| 2018/0376436 A1* | 12/2018 | Wolff | H04L 5/001 |
| 2019/0053061 A1* | 2/2019 | Sui | H04L 5/0091 |
| 2019/0075490 A1* | 3/2019 | Nagata | H04W 48/10 |
| 2019/0132170 A1* | 5/2019 | Si | H04L 27/266 |
| 2019/0140880 A1* | 5/2019 | Li | H04L 5/00 |
| 2019/0223163 A1* | 7/2019 | Ko | H04W 56/00 |
| 2020/0084739 A1* | 3/2020 | Si | H04L 5/0053 |

OTHER PUBLICATIONS

International Search Report and Written Opinion—PCT/US2018/033346—ISA/EPO—dated Aug. 21, 2018.
Nokia Networks: "On the Channel Raster Design for NB-IoT", 3GPP Draft; R1-160172, 3rd Generation Partnership Project (3GPP), Mobile Competence Centre, 650, Route Des Lucioles, F-06921, Sophia-Antipolis Cedex, France, vol. RAN WG1, No. Budapest, HU; Jan. 12, 2016, XP051064776, Retrieved from the Internet: URL: http://www.3gpp.org/ftp/tsg_ran/WG1_RL1/TSGR1_AH/LTE_NB-IoT_1601/Docs/ [retrieved on Jan. 12, 2016], 7 pages.
Qualcomm Incorporated: "Channel Raster and Synchronization Signal Raster Considerations", 3GPP Draft; R4-1704567, 3rd Generation Partnership Project (3GPP), Mobile Competence Centre, 650, Route Des Lucioles, F-06921, Sophia-Antipolis Cedex, France, vol. RAN WG4, No. Hangzhou, China; May 19, 2017-May 25, 2017 May 14, 2017, XP051276817, Retrieved from the Internet: URL:http://www.3gpp.org/ftp/Meetings_3GPP_SYNC/RAN4/Docs/ [retrieved on May 14, 2017], 3 pages.
Qualcomm Incorporated: "Synchronization Raster and Frequency Location Signalling in NR", 3GPP Draft; R2-1712372, 3rd Generation Partnership Project (3GPP), Mobile Competence Centre, 650, Route Des Lucioles, F-06921, Sophia-Antipolis Cedex, France, vol. RAN WG4, No. Reno, U.S.A; Nov. 27, 2017-Dec. 1, 2017, Nov. 17, 2017, XP051371440, Retrieved from the Internet: URL:http://www.3gpp.org/tsg_ran/WG2_RL2/TSGR2_100/Docs/R2-1712372.doc [retrieved on Nov. 17, 2017], 2 pages.
Qualcomm Incorporated: "Synchronization Raster for NR", 3GPP Draft; R4-1712184, 3rd Generation Partnership Project (3GPP), Mobile Competence Centre, 650, Route Des Lucioles, F-06921, Sophia-Antipolis Cedex, France, vol. RAN WG4, No. Reno, U.S.A; Nov. 27, 2017-Dec. 1, 2017, Nov. 17, 2017, XP051375120, Retrieved from the Internet: URL:http://www.3gpp.org/tsg_ran/WG4_Radio/TSGR4_85/Docs/R4-1712184.docx [retrieved on Nov. 17, 2017], 4 pages.
Samsung: "SS Frequency Raster for NR", 3GPP TSG RAN WG1 meeting #88bis, R1-1705319, 3GPP TSG RAN WG1 Meeting #88bis, 3rd Generation Partnership Project (3GPP), Mobile Competence Centre, 650, Route Des Lucioles, F-06921 Sophia-Antipolis Cedex, France, vol. RAN WG1, No. Spokane, USA, Apr. 3, 2017-Apr. 7, 2017, Apr. 2, 2017 (Apr. 2, 2017), XP051243449, pp. 1-4, Retrieved from the Internet: URL: http://www.3gpp.org/ftp/Meetings_3GPP_SYNC/RAN1/Docs/ [retrieved on Apr. 2, 2017].
Taiwan Search Report—TW107116986—TIPO—dated Oct. 1, 2021.

* cited by examiner

CHANNEL AND SYNC RASTER SIGNALING

CROSS REFERENCES

The present application for patent claims priority to U.S. Provisional Patent Application No. 62/508,879 by GHEORGHIU, et al., entitled "CHANNEL AND SYNC RASTER SIGNALING," filed May 19, 2017, assigned to the assignee hereof.

BACKGROUND

The following relates generally to wireless communication, and more specifically to channel and sync raster signaling.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices, which may be otherwise known as user equipment (UE).

Certain wireless communication systems may include a channel raster, which is generally the steps or frequencies within a channel that are available for communicating on. As one example, an LTE configured wireless communication system may include a channel raster of 100 KHz. Traditionally, the channel raster is located at the center of the channel such that the channel raster is symmetric with respect to the resource blocks, e.g., there are the same number of resource blocks to the left and right of the channel raster. Some wireless communication systems may be configured to support intra-band contiguous carrier aggregation (CA) without having to insert a guardband (or gap) within the resource block grid. For example, the distance between two component carriers (CC)s may be a multiple of the channel raster granularity and the resource block size. This may present an issue when the resource block size varies (for example) and/or when other configurations move the channel raster away from the center of the channel.

SUMMARY

The described techniques relate to improved methods, systems, devices, or apparatuses that identify communication channels or synchronization channels based on a channel raster or support channel and sync raster signaling. Generally, the described techniques provide methods for optimization of the channel/sync raster location or for signaling of the channel raster, channel resource usage in relation to the channel raster, and location information to a device in the situation where the channel raster is not located at the center of the channel, e.g., when the resource blocks are asymmetric with respect to the channel raster. Generally, references to the resource blocks being asymmetric with respect to the channel raster, or vice versa, refer to the channel raster being offset from the center of the channel such that there is not an equal number of resource blocks on both sides of the channel raster, e.g., the number of resource blocks to the left and to the right of the channel raster are different. Accordingly, in some aspects the network (e.g., a base station communicating with a user equipment (UE)) may select, determine, or otherwise identify that the channel raster is not centered on the channel (e.g., a component carrier (CC)) and transmit information indicative of the channel raster and also information indicative of the location of the resource blocks in relation to the channel raster (e.g., a first resource block, an offset for the first resource block relative to the channel raster (in frequency, number of resource blocks, number of subcarriers, and the like)). The network may identify the channel raster offset information on a per channel basis and/or on a per UE basis. The network may also transmit the indication on a per channel basis (e.g., broadcast to all devices) and/or on a per UE basis (e.g., unicast transmission to a particular UE). Moreover, the channel raster offset information may be associated with uplink and/or downlink channels.

A method of wireless communication is described. The method may include identifying a channel raster associated with a plurality of resource blocks of a channel, the plurality of resource blocks having an asymmetric relation with respect to the channel raster, configuring, based at least in part on the asymmetric relation, a message to indicate a resource block offset metric that comprises an indication of the channel raster and location information associated with a first resource block of the plurality of resource blocks, and transmitting the message to convey the indication of the resource block offset metric.

An apparatus for wireless communication is described. The apparatus may include means for identifying a channel raster associated with a plurality of resource blocks of a channel, the plurality of resource blocks having an asymmetric relation with respect to the channel raster, means for configuring, based at least in part on the asymmetric relation, a message to indicate a resource block offset metric that comprises an indication of the channel raster and location information associated with a first resource block of the plurality of resource blocks, and means for transmitting the message to convey the indication of the resource block offset metric.

Another apparatus for wireless communication is described. The apparatus may include a processor, memory in electronic communication with the processor, and instructions stored in the memory. The instructions may be operable to cause the processor to identify a channel raster associated with a plurality of resource blocks of a channel, the plurality of resource blocks having an asymmetric relation with respect to the channel raster, configure, based at least in part on the asymmetric relation, a message to indicate a resource block offset metric that comprises an indication of the channel raster and location information associated with a first resource block of the plurality of resource blocks, and transmit the message to convey the indication of the resource block offset metric.

A non-transitory computer readable medium for wireless communication is described. The non-transitory computer-readable medium may include instructions operable to cause a processor to identify a channel raster associated with a plurality of resource blocks of a channel, the plurality of resource blocks having an asymmetric relation with respect to the channel raster, configure, based at least in part on the asymmetric relation, a message to indicate a resource block offset metric that comprises an indication of the channel raster and location information associated with a first resource block of the plurality of resource blocks, and transmit the message to convey the indication of the resource block offset metric.

In some examples of the method, apparatus, and non-transitory computer-readable medium described above, the channel may be associated with at least one of an uplink channel, a downlink channel, or combinations thereof.

In some examples of the method, apparatus, and non-transitory computer-readable medium described above, the message comprises at least one of a broadcast message, a UE specific message, or combinations thereof.

Some examples of the method, apparatus, and non-transitory computer-readable medium described above may further include processes, features, means, or instructions for identifying, based at least in part on the asymmetric relation, an offset distance between the first resource block and the channel raster, wherein the location information comprises the offset distance.

In some examples of the method, apparatus, and non-transitory computer-readable medium described above, the offset distance comprises at least one of a frequency offset or a resource block count offset.

Some examples of the method, apparatus, and non-transitory computer-readable medium described above may further include processes, features, means, or instructions for identifying, based at least in part on the asymmetric relation, a frequency associated with the first resource block, wherein the location information comprises the frequency.

Some examples of the method, apparatus, and non-transitory computer-readable medium described above may further include processes, features, means, or instructions for identifying, based at least in part on the asymmetric relation, a resource block count associated with the plurality of resource blocks, wherein the location information comprises the resource block count.

Some examples of the method, apparatus, and non-transitory computer-readable medium described above may further include processes, features, means, or instructions for identifying a UE capability. Some examples of the method, apparatus, and non-transitory computer-readable medium described above may further include processes, features, means, or instructions for identifying the channel raster based at least in part on the UE capability.

Some examples of the method, apparatus, and non-transitory computer-readable medium described above may further include processes, features, means, or instructions for selecting, based at least in part on the UE capability, a signaling scheme to convey the indication of the resource block offset metric.

Some examples of the method, apparatus, and non-transitory computer-readable medium described above may further include processes, features, means, or instructions for identifying one or more unused resource blocks in the plurality of resource blocks. Some examples of the method, apparatus, and non-transitory computer-readable medium described above may further include processes, features, means, or instructions for configuring, based at least in part on the one or more unused resource blocks, the message to indicate a location parameter associated with the one or more unused resource blocks.

In some examples of the method, apparatus, and non-transitory computer-readable medium described above, the location parameter comprises at least one of an identifier associated with the one or more unused resource blocks, the first resource block and a resource block count associated with contiguous resource blocks, or combinations thereof.

In some examples of the method, apparatus, and non-transitory computer-readable medium described above, each of the one or more unused resource blocks comprise a resource block with a predetermined number of unallocated resource elements.

Some examples of the method, apparatus, and non-transitory computer-readable medium described above may further include processes, features, means, or instructions for identifying a synchronization raster offset between a first channel and a second channel of a band, the first channel and the second channel sharing a common resource block grid. Some examples of the method, apparatus, and non-transitory computer-readable medium described above may further include processes, features, means, or instructions for transmitting a synchronization signal on each resource block entry of the common resource block grid that may be between the synchronization raster offset.

In some examples of the method, apparatus, and non-transitory computer-readable medium described above, the synchronization raster offset comprises a 900 KHz raster offset and each resource block entry may be located at 100 KHz increments.

Some examples of the method, apparatus, and non-transitory computer-readable medium described above may further include processes, features, means, or instructions for identifying a synchronization raster offset between a first channel and a second channel of a band, the first channel and the second channel sharing a common resource block grid. Some examples of the method, apparatus, and non-transitory computer-readable medium described above may further include processes, features, means, or instructions for transmitting a synchronization signal on each channel raster entry that may be between two entries that may be on the common resource block grid.

A method of wireless communication is described. The method may include receiving a message that comprises an indication of a resource block offset metric and identifying, based at least in part on the resource block offset metric, a channel raster associated with a plurality of resource blocks of a channel, the plurality of resource blocks having an asymmetric relation with respect to the channel raster.

An apparatus for wireless communication is described. The apparatus may include means for receiving a message that comprises an indication of a resource block offset metric and means for identifying, based at least in part on the resource block offset metric, a channel raster associated with a plurality of resource blocks of a channel, the plurality of resource blocks having an asymmetric relation with respect to the channel raster.

Another apparatus for wireless communication is described. The apparatus may include a processor, memory in electronic communication with the processor, and instructions stored in the memory. The instructions may be operable to cause the processor to receive a message that comprises an indication of a resource block offset metric and identify, based at least in part on the resource block offset metric, a channel raster associated with a plurality of resource blocks of a channel, the plurality of resource blocks having an asymmetric relation with respect to the channel raster.

A non-transitory computer readable medium for wireless communication is described. The non-transitory computer-readable medium may include instructions operable to cause a processor to receive a message that comprises an indication of a resource block offset metric and identify, based at least in part on the resource block offset metric, a channel raster associated with a plurality of resource blocks of a channel, the plurality of resource blocks having an asymmetric relation with respect to the channel raster.

In some examples of the method, apparatus, and non-transitory computer-readable medium described above, the message comprises at least one of a broadcast message, a UE specific message, or combinations thereof.

Some examples of the method, apparatus, and non-transitory computer-readable medium described above may further include processes, features, means, or instructions for identifying, based at least in part on the asymmetric relation, an offset distance between the first resource block and the channel raster, wherein the resource block offset metric comprises the offset distance.

In some examples of the method, apparatus, and non-transitory computer-readable medium described above, the offset distance comprises at least one of a frequency offset or a resource block count offset.

Some examples of the method, apparatus, and non-transitory computer-readable medium described above may further include processes, features, means, or instructions for identifying, based at least in part on the asymmetric relation, a frequency associated with the first resource block, wherein the resource block offset metric comprises the frequency.

Some examples of the method, apparatus, and non-transitory computer-readable medium described above may further include processes, features, means, or instructions for identifying, based at least in part on the asymmetric relation, a resource block count associated with the plurality of resource blocks, wherein the resource block offset metric comprises the resource block count.

Some examples of the method, apparatus, and non-transitory computer-readable medium described above may further include processes, features, means, or instructions for determining, based at least in part on the message, that there may be one or more unused resource blocks in the plurality of resource blocks. Some examples of the method, apparatus, and non-transitory computer-readable medium described above may further include processes, features, means, or instructions for identifying, based at least in part on the message, a location parameter associated with the one or more unused resource blocks.

In some examples of the method, apparatus, and non-transitory computer-readable medium described above, the location parameter comprises at least one of an identifier associated with the one or more unused resource blocks, the first resource block and a resource block count associated with contiguous resource blocks, or combinations thereof.

In some examples of the method, apparatus, and non-transitory computer-readable medium described above, each of the one or more unused resource blocks comprise a resource block with a predetermined number of unallocated resource elements.

Some examples of the method, apparatus, and non-transitory computer-readable medium described above may further include processes, features, means, or instructions for identifying, based at least in part on the message, a synchronization raster offset between a first channel and a second channel of a band, the first channel and the second channel sharing a common resource block grid. Some examples of the method, apparatus, and non-transitory computer-readable medium described above may further include processes, features, means, or instructions for monitoring for a synchronization signal on each resource block entry of the common resource block grid that may be between the synchronization raster offset.

In some examples of the method, apparatus, and non-transitory computer-readable medium described above, the synchronization raster offset comprises a 900 KHz raster offset.

Some examples of the method, apparatus, and non-transitory computer-readable medium described above may further include processes, features, means, or instructions for identifying, based at least in part on the message, a synchronization raster offset between a first channel and a second channel of a band, the first channel and the second channel sharing a common resource block grid. Some examples of the method, apparatus, and non-transitory computer-readable medium described above may further include processes, features, means, or instructions for monitoring for a synchronization signal on each channel raster entry that may be between two entries that may be on the common resource block grid.

DETAILED DESCRIPTION

Aspects of the disclosure are initially described in the context of a wireless communications system. Certain wireless communication systems may be configured to support signaling channel raster and synchronization information between devices. For example, a channel (e.g., a component carrier (CC)) may have a channel raster that is not centered on the channel. Since the channel raster is not centered on the channel, the channel raster is asymmetric with respect to the resource blocks, or vice versa, e.g., there are more resource blocks on one side of the channel raster than on the other side. Accordingly, a network device (e.g., a base station) may identify the non-centered channel raster for the channel and configure a message to carry or otherwise provide an indication of the channel raster and, also, location information for the first resource block. The location information may provide for the receiving device to find the first resource block, e.g., exact location in frequency, relative location with respect to the total number of resource blocks, and the like. The receiving device may receive the message with the indication and use the indication to identify the channel raster for the channel and the location of the first resource block. The channel may be an uplink channel and/or a downlink channel. In some aspects, the network device may configure the channel raster for the channel based on the user equipment's (UE's) capabilities. The network device may transmit the indication in a broadcast message and/or a unicast message. Accordingly, the network device may support use of offset channel raster(s) and related signaling mechanisms to support communications.

Aspects of the disclosure are further illustrated by and described with reference to apparatus diagrams, system diagrams, and flowcharts that relate to channel and sync raster signaling.

Figure 1:
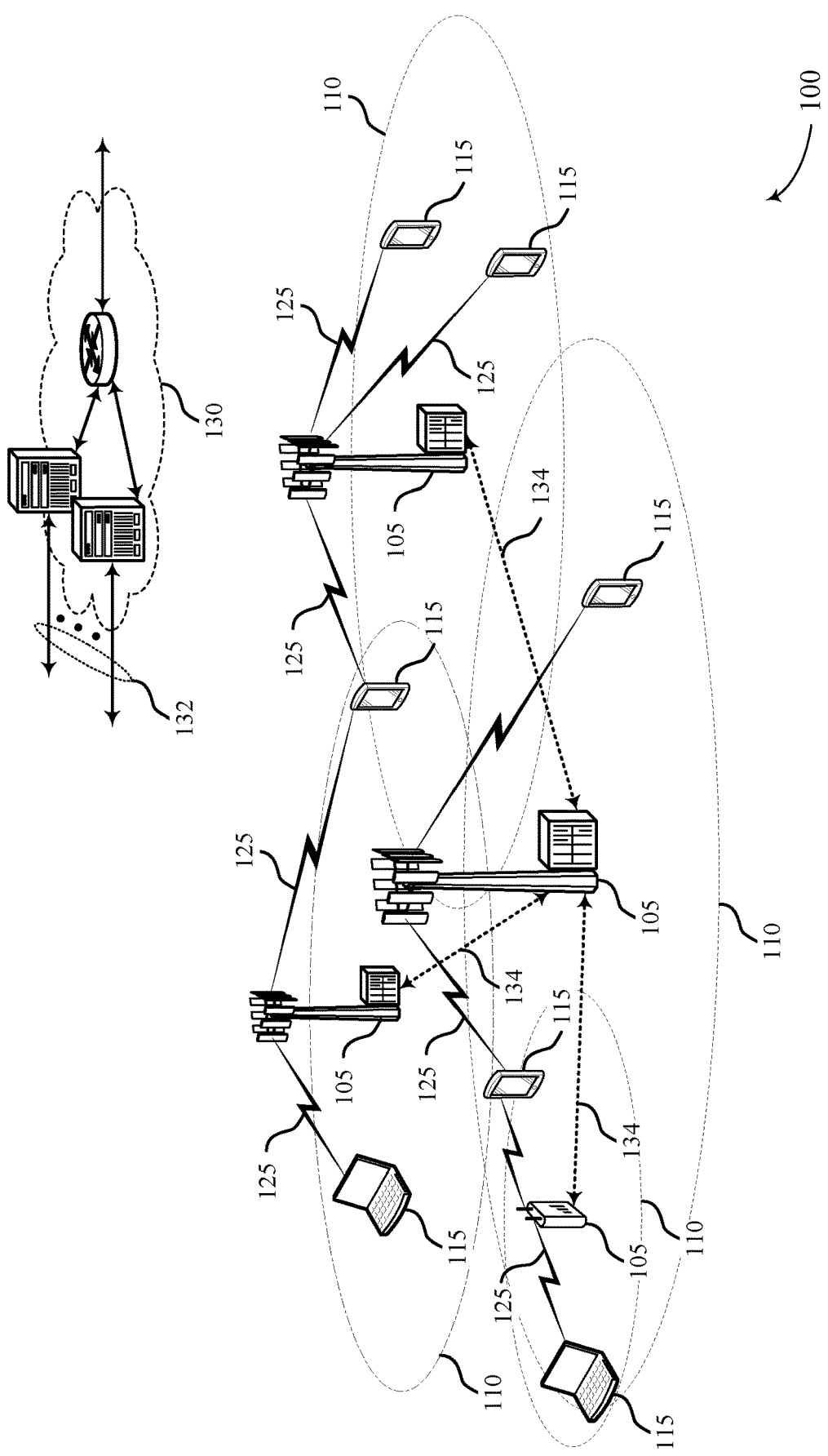
FIG. 1 illustrates an example of a system for wireless communication that supports channel and sync raster signaling in accordance with aspects of the present disclosure.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or a downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as CA or multi-carrier operation. A carrier may also be referred to as a CC, a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

In some cases, wireless communication system 100 may support intra-band contiguous CA without guard band. The distance between two CCs may be a multiple of the channel raster granularity and the resource block size. In CA without guard band, all the spectrum can be filled with resource blocks. In CA with guard band, not all of the spectrum can be filled with RBs so there will be some spectrum that is not used, e.g., gaps.

In some aspects, CCs may refer to the CCs that are on the same subcarrier grid or on the same resource block grid. The same subcarrier grid may indicate that the subcarriers from all CCs can be processed by the same fast Fourier transform (FFT) so that the distance between channel rasters of the CCs is a common multiple of channel raster spacing and subcarrier spacing. For example, a channel raster of 100 kHz and subcarrier spacing (SCS) of 15 kHz may lead to a spacing between CCs that are multiples of 300 kHz. This may result in the space between CCs being a multiple of SCS but not a multiple of 12×SCS, which may be a resource block. When the system cannot allocate fractional RBs, there may be some subcarriers that cannot be allocated (scheduled). The same resource block grid may indicate that the subcarriers from all CCs can be processed by the same FFT and, additionally, all of the space between the CCs can be filled up with resource blocks. This may result in the distance between the channel rasters of the CCs being a common multiple of channel raster granularity and resource block size. For example, with 100 kHz channel raster and resource block size of 180 kHz (e.g., 15 kHz SCS with 12 subcarriers in each resource block), the distance between the channel raster is a multiple of 900 kHz. To support intraband contiguous CA without any guardband, the CCs may be on the same resource block grid.

In some aspects, wireless communication system 100 may support one wideband channel being treated as a single channel by some UEs 115 and as intra-band contiguous CA by other UEs 115. As one example with one 200 MHz channel, the 200 MHz channel may be composed of two channels of 100 MHz each, e.g., CC1 and CC2. In some aspects, UE 115 may access either CC1 or CC2 (e.g., UEs that are capable of 100 MHz total bandwidth). In some aspects, UE 115 may access the entire 200 MHz channel as one single channel (e.g., UEs that are capable of 200 MHz total bandwidth). In some aspects, UE 115 may access the 200 MHz channel as 2×100 MHz CA (e.g., UEs that are capable of 200 MHz total bandwidth and do CA).

In some aspects, wireless communication system 100 may support all such UEs 115 and maximize spectrum utilization where all three channels (e.g., the 200 MHz channel and/or CC1/CC2) are on the same resource block grid. For example, using a 100 khz channel raster granularity and a 15 kHz SCS, CC2 channel raster would be 149.9 and 200 MHz whereas the CC1 channel raster would be on 99.5 or 100.4 MHz. This means that the channel raster will not be situated in the center of the CC1 and CC2 channels. That is, in the example above, in order to place the raster of the 200 MHz at the center, the channel raster of CC1 and CC2 may be shifted (left or right). Even if the channel raster of the 200 MHz channel is in the center, the raster of CC1 and CC2 may not be in the center of their own channels anymore. That is, the channel raster may not be in the center of the CC anymore so the number of resource blocks to the left and to the right of the channel raster will be different.

In some aspects, wireless communication system 100 may support signaling the location of the resource blocks in relation to the channel raster to the UE 115 so that the UE 115 knows where the allocated resource blocks are. For the same channel raster entry, wireless communication system 100 may have different offsets (e.g., varying) of resource block allocations. For example, a base station 105 may identify a channel raster associated with a plurality of resource blocks of a channel, the plurality of resource blocks having an asymmetric relation with respect to the channel raster. The base station 105 may configure, based at least in part on the asymmetric relation, a message to indicate a resource block offset metric that comprises an indication of the channel raster and location information associated with a first resource block of the plurality of resource blocks. The base station 105 may transmit the message to convey the indication of the resource block offset metric. A UE 115 may receive the message that comprises the indication of a resource block offset metric and identify, based at least in part on the resource block offset metric, a channel raster associated with a plurality of resource blocks of a channel, the plurality of resource blocks having an asymmetric relation with respect to the channel raster.

Figure 2:
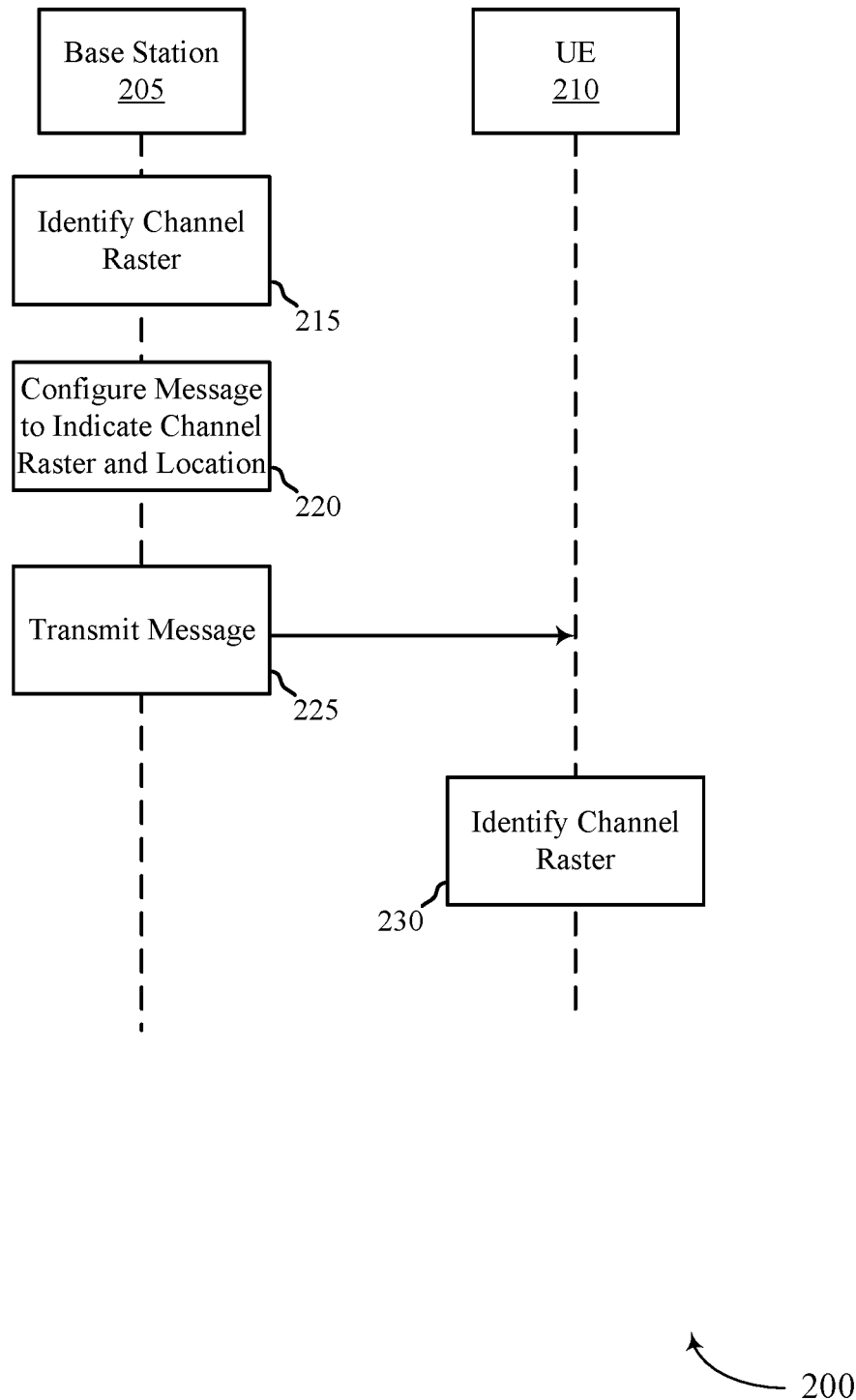
FIG. 2 illustrates an example of a process that supports channel and sync raster signaling in accordance with aspects of the present disclosure.

FIG. 2 illustrates an example of a process 200 that supports channel and sync raster signaling in accordance with various aspects of the present disclosure. In some examples, process 200 may implement aspects of wireless communication system 100. Process 200 may include a base station 205 and a UE 210, which may be examples of the corresponding devices described herein. Generally, process 200 illustrates one example where base station 205 signals an indication to UE 210 of the channel raster and location information for the first resource block when the channel raster is not centered in the channel.

At 215, base station 205 may identify a channel raster. The channel raster may be associated with a plurality of resource blocks of the channel. The resource blocks may be asymmetrical with respect to the channel raster, e.g., there may be more resource blocks on one side of the channel raster than there are on the other side. The asymmetric relation may indicate that the channel raster is offset from the middle of the channel. The channel may be an uplink channel and/or a downlink channel. The channel may be a CC channel, in some examples.

At 220, base station 205 may configure a message to provide an indication of the channel raster and location information. For example, base station 205 may configure the message to carry or otherwise convey an indication of a resource block offset metric that includes the indication of the channel raster and the location information. The location information may be associated with a first resource block and may provide information supporting the UE 210 being able to locate the first resource block.

In some aspects, the location information may include an offset for the first resource block relative to the channel raster, e.g., in terms of an absolute frequency, a number of resource blocks, a number of subcarriers, etc. For example, base station 205 may, based on the asymmetric relation, identify an offset distance (e.g., frequency offset, resource block count offset, etc.) between the first resource block and the channel raster. The location information may include the offset distance. Base station 205 may, based on the asymmetric relation, identify a frequency associated with the first resource block, e.g., an absolute frequency or carrier of the first resource block. The location information may include the frequency associated with the first resource block. Base station 205 may identify a resource block count associated with the resource blocks, e.g., a number of contiguous resource blocks. The location may include the resource block count. In some aspects, the location information may include the frequency of the first resource block and the resource block count.

In some aspects, base station 205 may select the channel raster for the channel based on the capability of UE 210. For example, base station 205 may identify the UE capability (e.g., supported bandwidth, CA support, etc.) and identify or otherwise select the channel raster for UE 210 based on the supported capability (e.g., UE-specific). Moreover, base station 205 may use a signaling scheme for the message based on the capability of UE 210, e.g., broadcast vs unicast signaling, signaling channel, etc.

In some aspects, the plurality of resource blocks may have gaps (e.g., unused resource blocks, resource elements, etc.). For example, depending on how the channel raster is defined it may not be possible to fill up the entire spectrum between two CCs. For example, a 10 MHz CC which is an aggregation of two 5 MHz channels may have some subcarriers (resource elements) in the center that cannot be used. In the example of a 200 MHz CC there may be some resource elements around the center that could not be used. Where exactly these resource blocks are located may be signaled to UE 210. If there is a gap in frequency in the resource elements that are allocated to UE 210, base station 205 may signal this information to UE 210. The signaling may include the number of resource elements that are not used, the location of the contiguous resource blocks that are in use, and the like. When multiple channels are aggregated (e.g. 400 MHz channel is an aggregation of two 200 MHz or four 100 MHz channels, there could be multiple "holes" or gaps), the location of all these holes may be aggregated. In some aspects, base station 205 may broadcast which resource elements are not used in the wider channel. In some aspects, base station 205 may configure UEs with resource elements that are not used. In some aspects, base station may broadcast the start and length of each contiguous block of resource blocks. In some aspects, base station 205 may configure UEs individually with different blocks of contiguous resource blocks.

Accordingly, base station 205 may identify which resource blocks are unused and configure the message to indicate location parameter(s) associated with the unused resource blocks. The location parameter(s) may include, but are not limited to, an identifier of the unused resource blocks, the first resource block and a resource block count for contiguous resource blocks, and the like.

At 225, base station 205 may transmit (and UE 210 may receive) the message that carries or otherwise conveys the indication of the resource block offset metric. The message may be broadcast to all UEs and/or unicast to a particular UE, e.g., UE 210.

In some aspects, base station 205 may broadcast the relation between the channel raster entry and the resource block locations. This may be an offset for the edge resource block (the first resource block) relative to the channel raster (e.g., in absolute frequency or number of resource blocks or number of subcarriers). In some aspects, base station 205 may broadcast an absolute frequency such that UE 210 may locate the resource blocks that are used in the channel, e.g., an absolute frequency of the edge resource block in Hz.

In some aspects, base station 205 may configure UE 210 with the specific resource block location. This may be an offset for the edge resource block relative to the channel raster (e.g., in absolute frequency or number of resource blocks or number of subcarriers). This may be an absolute frequency or an absolute frequency offset (in Hz) from the channel raster. The specific resource block location may be based on UE 210 capabilities that are signaled to the network, e.g., the radio frequency (RF) capabilities of UE 210.

In some aspects, base station 205 may signal where the channel raster for an uplink channel is located and where the resource blocks are used in the uplink channel (e.g., even for a TDD configured system, the uplink and/or downlink raster or resource block location may be different). The channel raster configuration may be common for the channel (e.g., channel specific). Base station 205 may broadcast the uplink channel raster as an absolute frequency and the offset of the edge resource block relative to the channel raster. In some aspects, the channel raster may define a set of radio frequency (RF) reference frequencies that are used to identify the RF channel position. The RF reference frequency for an RF channel may map to a resource element on the carrier. In some aspects, the mapping may be determined based on the total number of resource blocks that are allocated in the channel and apply to both uplink and downlink. In some aspects, the RF reference frequency in the uplink and/or downlink may be designated in a NR Absolute Radio Frequency Channel Number (NR-ARFCN) in a defined range on the global frequency raster.

Base station 205 may broadcast the absolute frequency of the edge resource block and the number of resource blocks to be used. This may be any frequency or from a set of allowed frequencies. The channel raster configuration may be configured per UE (e.g., UE-specific). Base station 205 may configure each UE with the uplink channel raster as an absolute frequency and the offset of the edge resource block relative to the raster. Base station 205 may configure each UE with the absolute frequency of the edge resource block and the number of resource blocks to be used. This may be any frequency or from a set of allowed frequencies.

At 230, UE 210 may identify the channel raster using the resource block offset metric. For example, UE 210 may decode the message received from base station 205 and identify the channel raster associated with the resource blocks of the channel. UE 210 may identify the location information that is also indicated in the message. Accordingly, UE 210 may use the message to identify the channel raster offset metric for the channel and/or for a plurality of channels. The channel(s) may be uplink and/or downlink channels.

Figure 3:
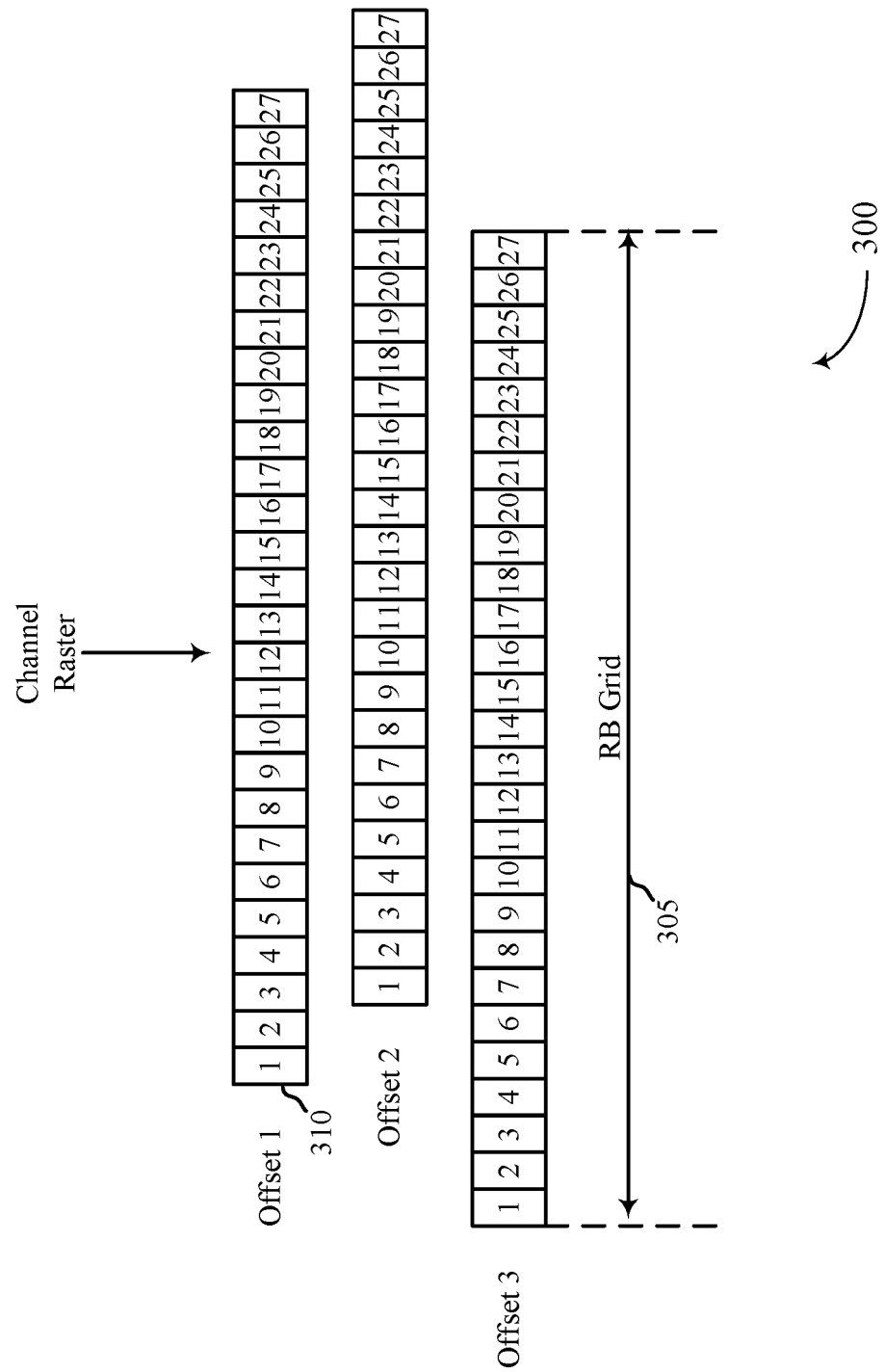
FIG. 3 illustrates an example of a channel raster offset configuration that supports channel and sync raster signaling in accordance with aspects of the present disclosure.

FIG. 3 illustrates an example of a channel raster offset configuration 300 that supports channel and sync raster signaling in accordance with various aspects of the present disclosure. In some examples, channel raster offset configuration 300 may implement aspects of wireless communication system 100 and/or process 200.

Generally, channel raster offset configuration 300 illustrates three resource block grids 305 (with only one being labeled). Each resource block grid 305 includes a plurality of resource blocks 310. Although channel raster offset configuration 300 illustrates each resource block grid 305 as having 27 resource blocks 310, it is to be understood that each (or all) of the resource block grids 305 may have more or fewer resource blocks 310.

Channel raster offset configuration 300 illustrates three examples of a channel raster that is not centered on the channel. For example, the first channel raster offset (Offset 1) may include a resource block 310 where the channel raster is located at resource block 12. This may result in the resource blocks 310 having an asymmetric relation with respect to the channel raster, e.g., 15 resource blocks 310 to the right of the channel raster and 12 resource blocks 310 to the left of the channel raster. Similarly, the second channel raster offset (Offset 2) may include a channel raster that is at resource block 10. This also results in the resource blocks 310 having an asymmetric relation with respect to the channel raster, e.g., 17 resource blocks 310 to the right and 10 resource blocks 310 to the left of the channel raster.

In some aspects, the different channel raster offsets are based on a channel. For example, Offset 1 may be associated with a first channel, Offset 2 may be associated with a second channel, and Offset 3 may be associated with a third channel. In some aspects, the different channel raster offsets are based on a UE. For example, Offset 1 may be associated with a first UE, Offset 2 may be associated with a second UE, and Offset 3 may be associated with a third UE. In some aspects, the different channel raster offsets may be associated with different UEs and different channels.

Figure 4:
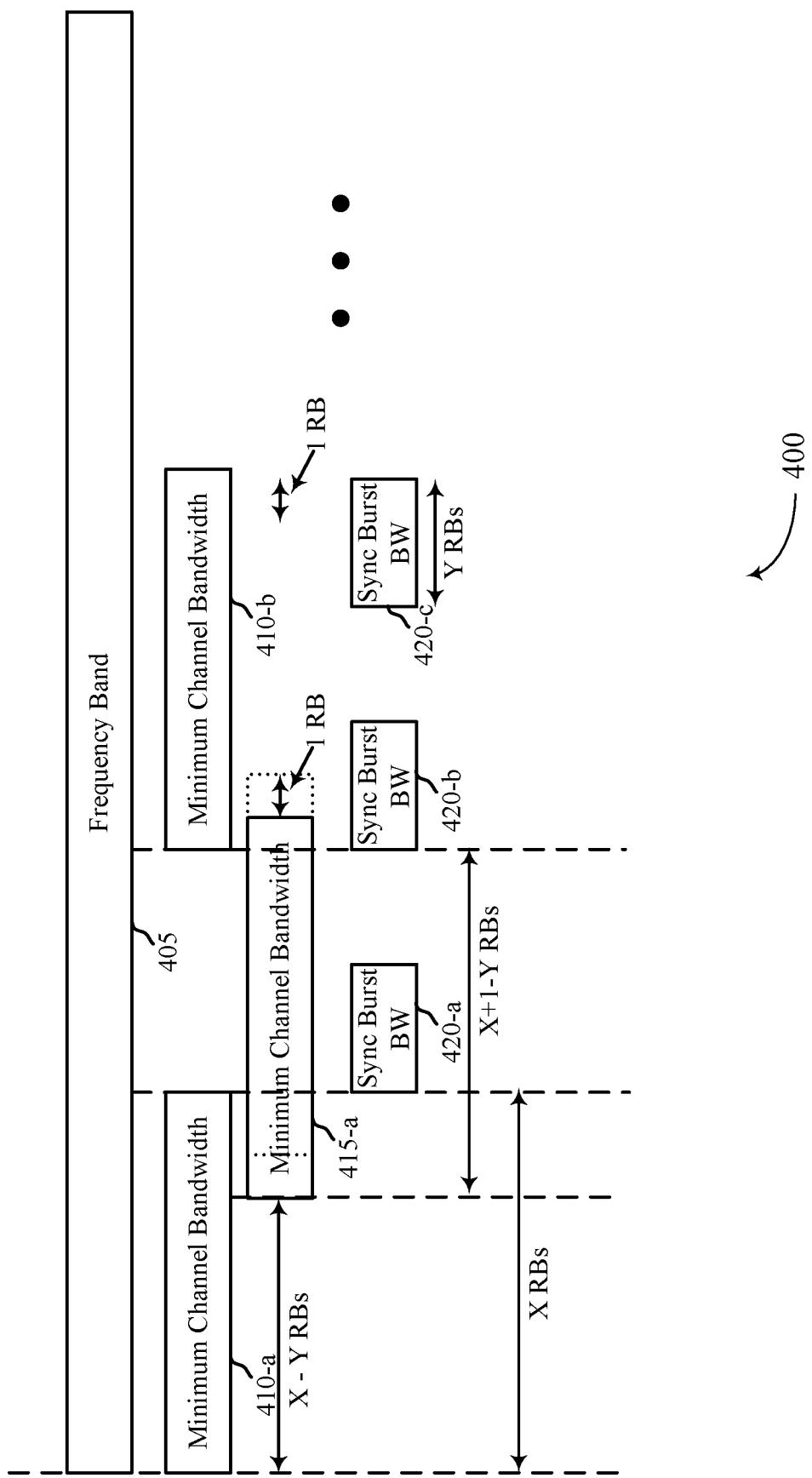
FIG. 4 illustrates an example of a synchronization raster configuration that supports channel and sync raster signaling in accordance with aspects of the present disclosure.

FIG. 4 illustrates an example of a synchronization raster configuration 400 that supports channel and sync raster signaling in accordance with various aspects of the present disclosure. In some examples, synchronization raster configuration 400 may implement aspects of wireless communication system 100, process 200, and/or channel raster offset configuration 300.

Generally, synchronization raster configuration 400 illustrates a frequency band 405 that forms a first channel 410 and a second channel 415. Each of the first channel 410 and second channel 415 may have an associated minimum bandwidth that occupies some, but not all, of the frequency band 405. A base station may transmit a synchronization signal 420 that covers, at least in some aspects, portions of both the first channel 410 and the second channel 415. For example, the base station may identify a synchronization raster offset between the first channel 410 and the second channel 415 of the frequency band 405. The first channel 410 and the second channel 415 may share a common resource block grid, e.g., the resource blocks may be aligned in some aspects between the first and second channels. In some aspects, the base station may transmit a synchronization signal 420 on each resource block entry of the common resource block grid that is between the synchronization offset. In some aspects, the base station may transmit a synchronization signal on each channel raster entry that is between two entries that are on the common resource grid.

In some aspects, a synchronization signal 420 may not sit in the middle of the channel, but may still be located on the channel raster. Different channels within a band can share the same synchronization burst location (e.g., primary synchronization signal (PSS), secondary synchronization signal (SSS)). For example, the first instance of the first channel 410 and the first instance of the second channel 415 may use the same sync burst block, e.g., synchronization signal 420. The same sync burst block may be used for the channel presented in the dotted line (e.g., a channel shifted one resource block).

In some aspects, the sync burst locations in frequency band 405 may be down selected from the channel raster based on the relationship (X+1-Y RBs). In some aspects, this may be the maximum spacing between sync raster entries. To support different channels using the same sync burst location, the channels may be on the same resource block grid. If the channel raster is not a multiple of the resource block size, all the channel raster entries between two resource block grid offsets may also be supported. For example, with a 100 KHz channel raster and a 180 KHz resource block size, the resource block grid may be 900 KHz. The sync raster may have 100 KHz to 800 KHz entries to cover all the channels that have raster offsets of 100 KHz between 100 KHz and 900 KHz (e.g., 100, 200, 300, 400, 500, 600, 700, 800 KHz) which is the next entry on the same resource block grid as 100 kHz.

In some aspects, a UE may search for synchronization signal(s) 420 on each channel raster entry that is between two entries that are on the resource block grid for each sync channel entry. For example, if the sync raster distance is 2 MHz (0, 2 MHz, 4 MHz, etc.) the UE may search also on 100 khz, 200, 300, 400, 500, 600, 700, and 800 kHz, and also on 2.1, 2.2, 2.3, 2.4, 2.5, 2.6, 2.7, 2.8 MHz, etc.

Figure 5:
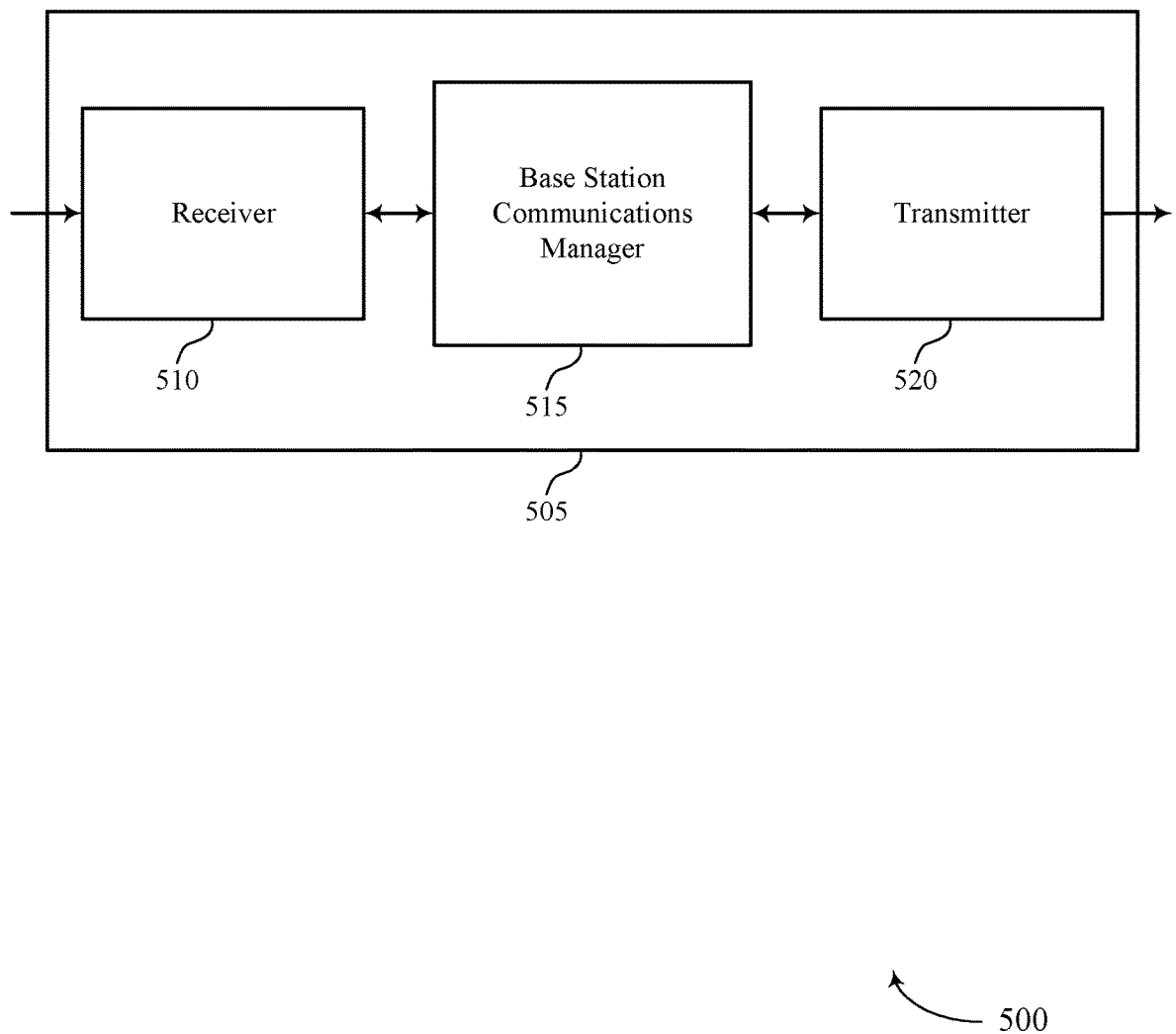
FIGS. 5 through 7 show block diagrams of a device that supports channel and sync raster signaling in accordance with aspects of the present disclosure.

FIG. 5 shows a block diagram 500 of a wireless device 505 that supports channel and sync raster signaling in accordance with aspects of the present disclosure. Wireless device 505 may be an example of aspects of a base station 105 as described herein. Wireless device 505 may include receiver 510, base station communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to channel and sync raster signaling, etc.). Information may be passed on to other components of the device. The receiver 510 may be an example of aspects of the transceiver 835 described with reference to FIG. 8. The receiver 510 may utilize a single antenna or a set of antennas.

Base station communications manager 515 may be an example of aspects of the base station communications manager 815 described with reference to FIG. 8.

Base station communications manager 515 and/or at least some of its various sub-components may be implemented in hardware, software executed by a processor, firmware, or any combination thereof. If implemented in software executed by a processor, the functions of the base station communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 515 and/or at least some of its various sub-components may be physically located at various positions, including being distributed such that portions of functions are implemented at different physical locations by one or more physical devices. In some examples, base station communications manager 515 and/or at least some of its various sub-components may be a separate and distinct component in accordance with various aspects of the present disclosure. In other examples, base station communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 515 may identify a channel raster associated with a set of resource blocks of a channel, the set of resource blocks having an asymmetric relation with respect to the channel raster. Base station communications manager 515 may configure, based on the asymmetric relation, a message to indicate a resource block offset metric that includes an indication of the channel raster and location information associated with a first resource block of the set of resource blocks. Base station communications manager 515 may transmit the message to convey the indication of the resource block offset metric.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
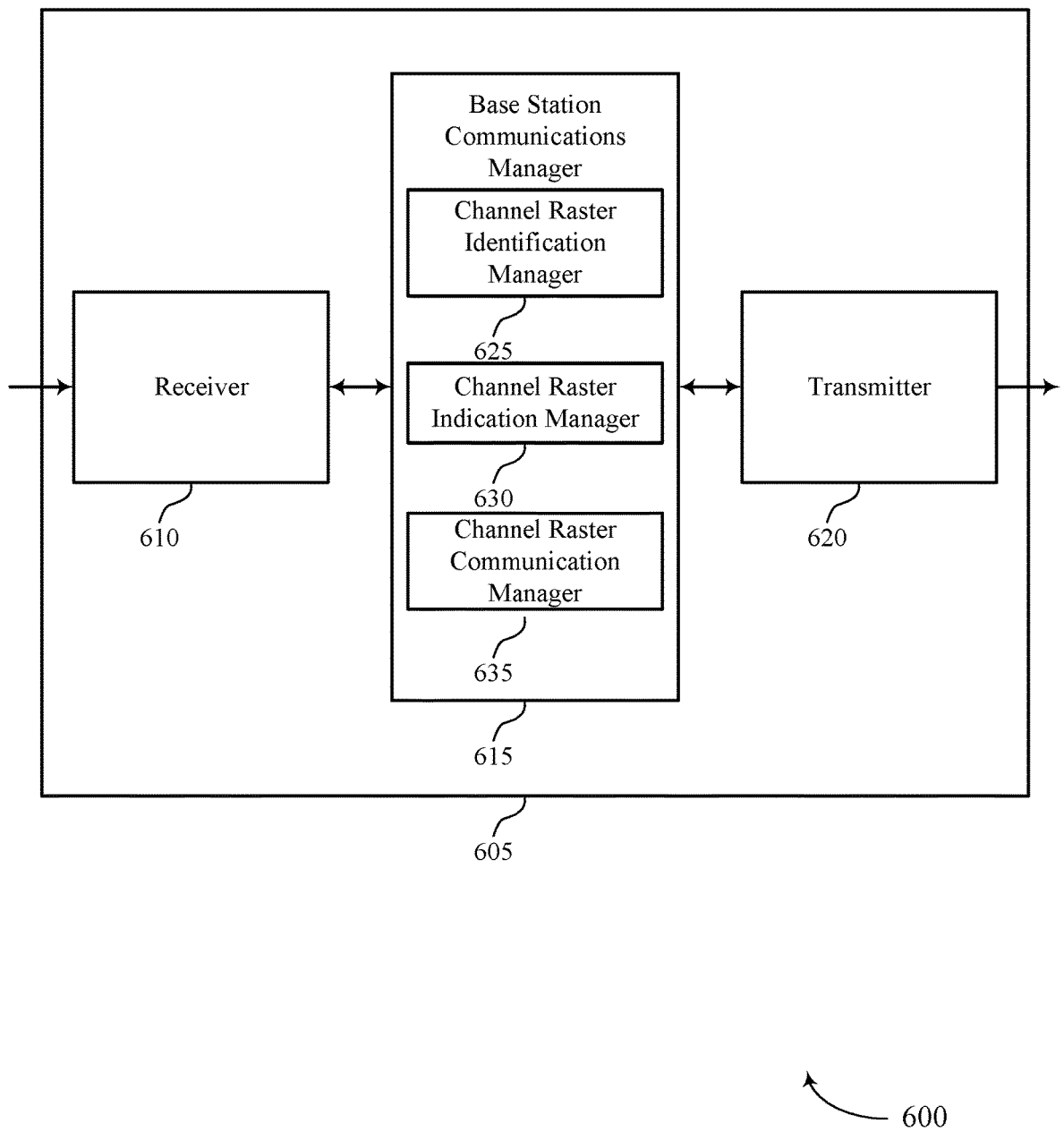

FIG. 6 shows a block diagram 600 of a wireless device 605 that supports channel and sync raster signaling in accordance with aspects of the present disclosure. Wireless device 605 may be an example of aspects of a wireless device 505 or a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to channel and sync raster signaling, etc.). Information may be passed on to other components of the device. The receiver 610 may be an example of aspects of the transceiver 835 described with reference to FIG. 8. The receiver 610 may utilize a single antenna or a set of antennas.

Base station communications manager 615 may be an example of aspects of the base station communications manager 815 described with reference to FIG. 8. Base station communications manager 615 may also include channel raster identification manager 625, channel raster indication manager 630, and channel raster communication manager 635.

Channel raster identification manager 625 may identify a channel raster associated with a set of resource blocks of a channel, the set of resource blocks having an asymmetric relation with respect to the channel raster. In some cases, the channel is associated with at least one of an uplink channel, a downlink channel, or combinations thereof.

Channel raster indication manager 630 may configure, based on the asymmetric relation, a message to indicate a resource block offset metric that includes an indication of the channel raster and location information associated with a first resource block of the set of resource blocks.

Channel raster communication manager 635 may transmit the message to convey the indication of the resource block offset metric. In some cases, the message includes at least one of a broadcast message, a UE specific message, or combinations thereof.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
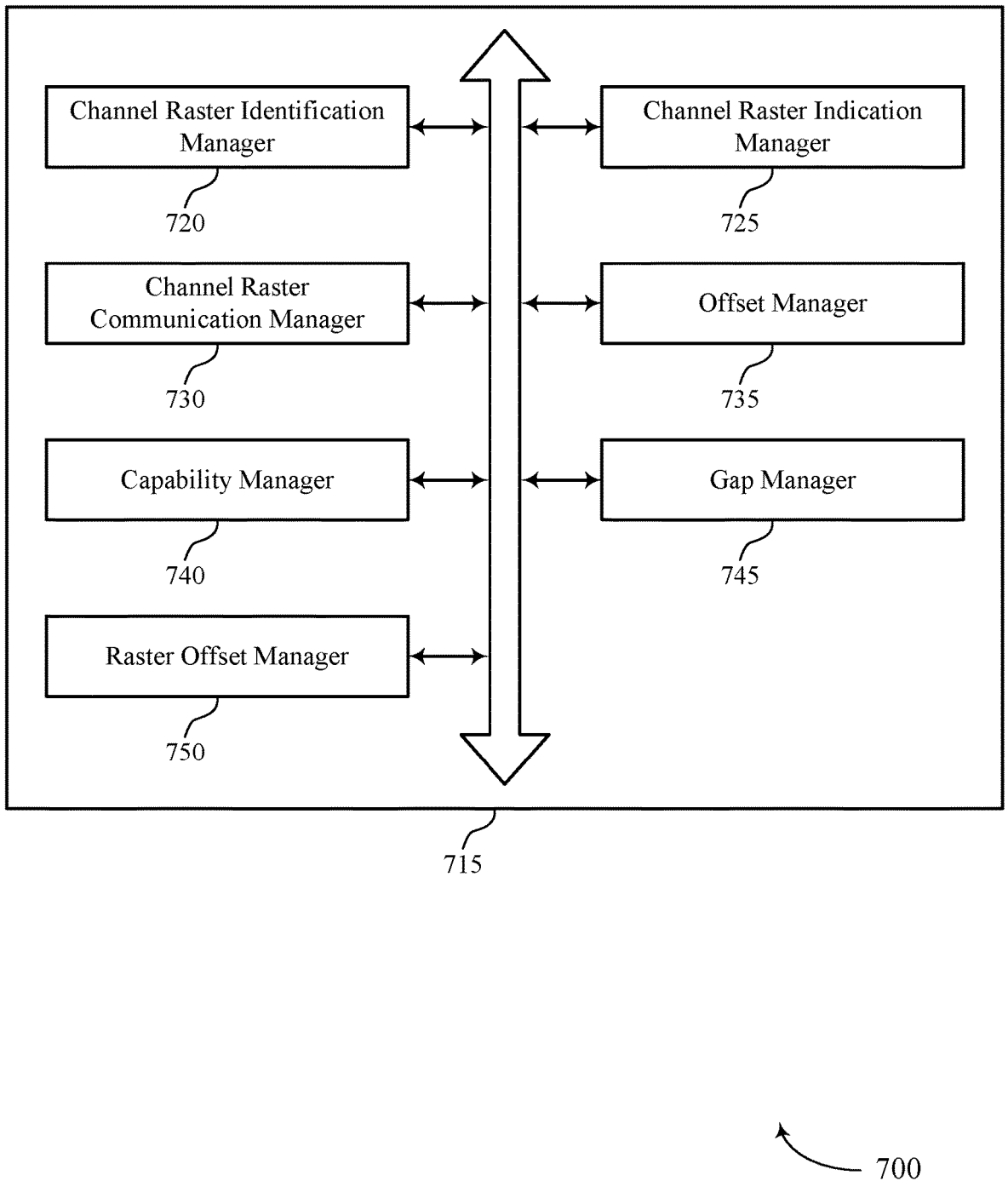

FIG. 7 shows a block diagram 700 of a base station communications manager 715 that supports channel and sync raster signaling in accordance with aspects of the present disclosure. The base station communications manager 715 may be an example of aspects of a base station communications manager 515, a base station communications manager 615, or a base station communications manager 815 described with reference to FIGS. 5, 6, and 8. The base station communications manager 715 may include channel raster identification manager 720, channel raster indication manager 725, channel raster communication manager 730, offset manager 735, capability manager 740, gap manager 745, and raster offset manager 750. Each of these modules may communicate, directly or indirectly, with one another (e.g., via one or more buses).

Channel raster identification manager 720 may identify a channel raster associated with a set of resource blocks of a channel, the set of resource blocks having an asymmetric relation with respect to the channel raster. In some cases, the channel is associated with at least one of an uplink channel, a downlink channel, or combinations thereof.

Channel raster indication manager 725 may configure, based on the asymmetric relation, a message to indicate a resource block offset metric that includes an indication of the channel raster and location information associated with a first resource block of the set of resource blocks.

Channel raster communication manager 730 may transmit the message to convey the indication of the resource block offset metric. In some cases, the message includes at least one of a broadcast message, a UE specific message, or combinations thereof.

Offset manager 735 may identify, based on the asymmetric relation, an offset distance between the first resource block and the channel raster, where the location information includes the offset distance. Offset manager 735 may identify, based on the asymmetric relation, a frequency associated with the first resource block, where the location information includes the frequency. Offset manager 735 may identify, based on the asymmetric relation, a resource block count associated with the set of resource blocks, where the location information includes the resource block count. In some cases, the offset distance includes at least one of a frequency offset or a resource block count offset.

Capability manager 740 may identify a UE capability and identify the channel raster based on the UE capability. Capability manager 740 may select, based on the UE capability, a signaling scheme to convey the indication of the resource block offset metric.

Gap manager 745 may identify one or more unused resource blocks in the set of resource blocks and configure, based on the one or more unused resource blocks, the message to indicate a location parameter associated with the one or more unused resource blocks. In some cases, the location parameter includes at least one of an identifier associated with the one or more unused resource blocks, the first resource block and a resource block count associated with contiguous resource blocks, or combinations thereof. In some cases, each of the one or more unused resource blocks include a resource block with a predetermined number of unallocated resource elements.

Raster offset manager 750 may identify a synchronization raster offset between a first channel and a second channel of a band, the first channel and the second channel sharing a common resource block grid. Raster offset manager 750 may transmit a synchronization signal on each resource block entry of the common resource block grid that is between the synchronization raster offset. Raster offset manager 750 may transmit a synchronization signal on each channel raster entry that is between two entries that are on the common resource block grid. In some cases, the synchronization raster offset includes a 900 KHz raster offset and each resource block entry is located at 100 KHz increments.

Figure 8:
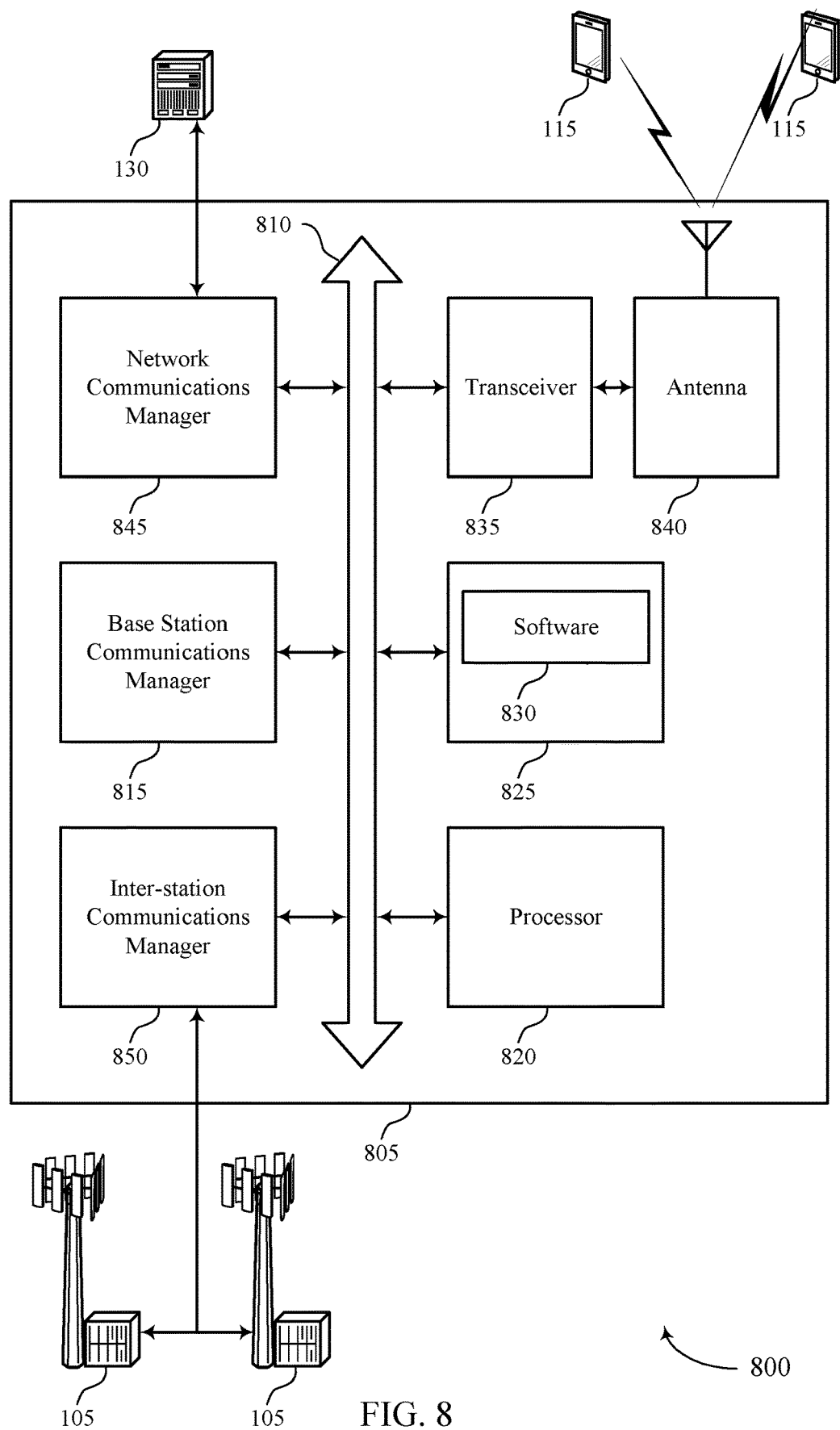
FIG. 8 illustrates a block diagram of a system including a base station that supports channel and sync raster signaling in accordance with aspects of the present disclosure.

FIG. 8 shows a diagram of a system 800 including a device 805 that supports channel and sync raster signaling in accordance with aspects of the present disclosure. Device 805 may be an example of or include the components of wireless device 505, wireless device 605, or a base station 105 as described herein. Device 805 may include components for bi-directional voice and data communications including components for transmitting and receiving communications, including base station communications manager 815, processor 820, memory 825, software 830, transceiver 835, antenna 840, network communications manager 845, and inter-station communications manager 850. These components may be in electronic communication via one or more buses (e.g., bus 810). Device 805 may communicate wirelessly with one or more UEs 115.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting channel and sync raster signaling).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support channel and sync raster signaling. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

Network communications manager 845 may manage communications with the core network (e.g., via one or more wired backhaul links). For example, the network communications manager 845 may manage the transfer of data communications for client devices, such as one or more UEs 115.

Inter-station communications manager 850 may manage communications with other base station 105, and may include a controller or scheduler for controlling communications with UEs 115 in cooperation with other base stations 105. For example, the inter-station communications manager 850 may coordinate scheduling for transmissions to UEs 115 for various interference mitigation techniques such as beamforming or joint transmission. In some examples, inter-station communications manager 850 may provide an X2 interface within an LTE/LTE-A wireless communication network technology to provide communication between base stations 105.

Figure 9:
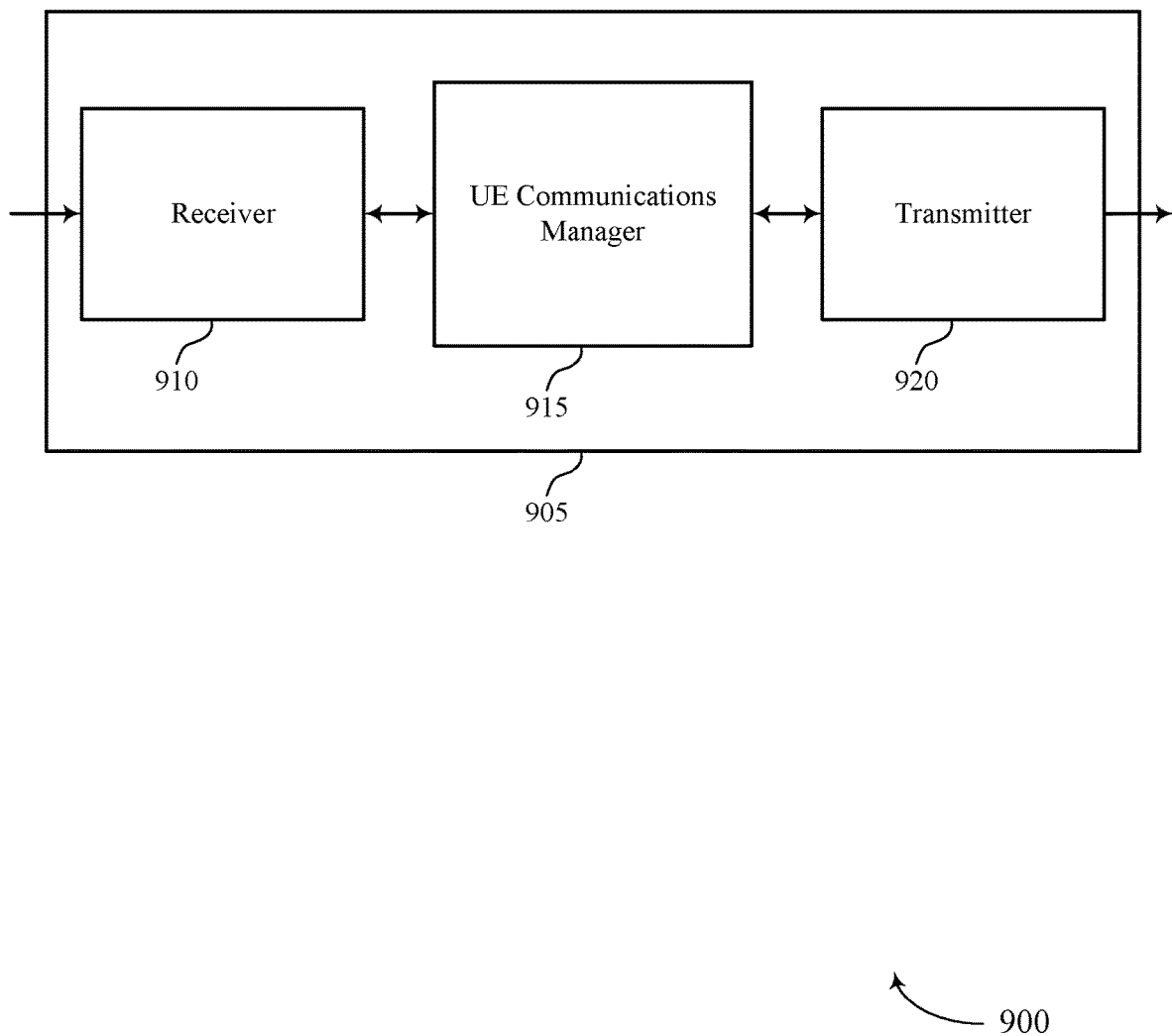
FIGS. 9 through 11 show block diagrams of a device that supports channel and sync raster signaling in accordance with aspects of the present disclosure.

FIG. 9 shows a block diagram 900 of a wireless device 905 that supports channel and sync raster signaling in accordance with aspects of the present disclosure. Wireless device 905 may be an example of aspects of a UE 115 as described herein. Wireless device 905 may include receiver 910, UE communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to channel and sync raster signaling, etc.). Information may be passed on to other components of the device. The receiver 910 may be an example of aspects of the transceiver 1235 described with reference to FIG. 12. The receiver 910 may utilize a single antenna or a set of antennas.

UE communications manager 915 may be an example of aspects of the UE communications manager 1215 described with reference to FIG. 12.

UE communications manager 915 and/or at least some of its various sub-components may be implemented in hardware, software executed by a processor, firmware, or any combination thereof. If implemented in software executed by a processor, the functions of the UE communications manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 915 and/or at least some of its various sub-components may be physically located at various positions, including being distributed such that portions of functions are implemented at different physical locations by one or more physical devices. In some examples, UE communications manager 915 and/or at least some of its various sub-components may be a separate and distinct component in accordance with various aspects of the present disclosure. In other examples, UE communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 915 may receive a message that includes an indication of a resource block offset metric and identify, based on the resource block offset metric, a channel raster associated with a set of resource blocks of a channel, the set of resource blocks having an asymmetric relation with respect to the channel raster.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
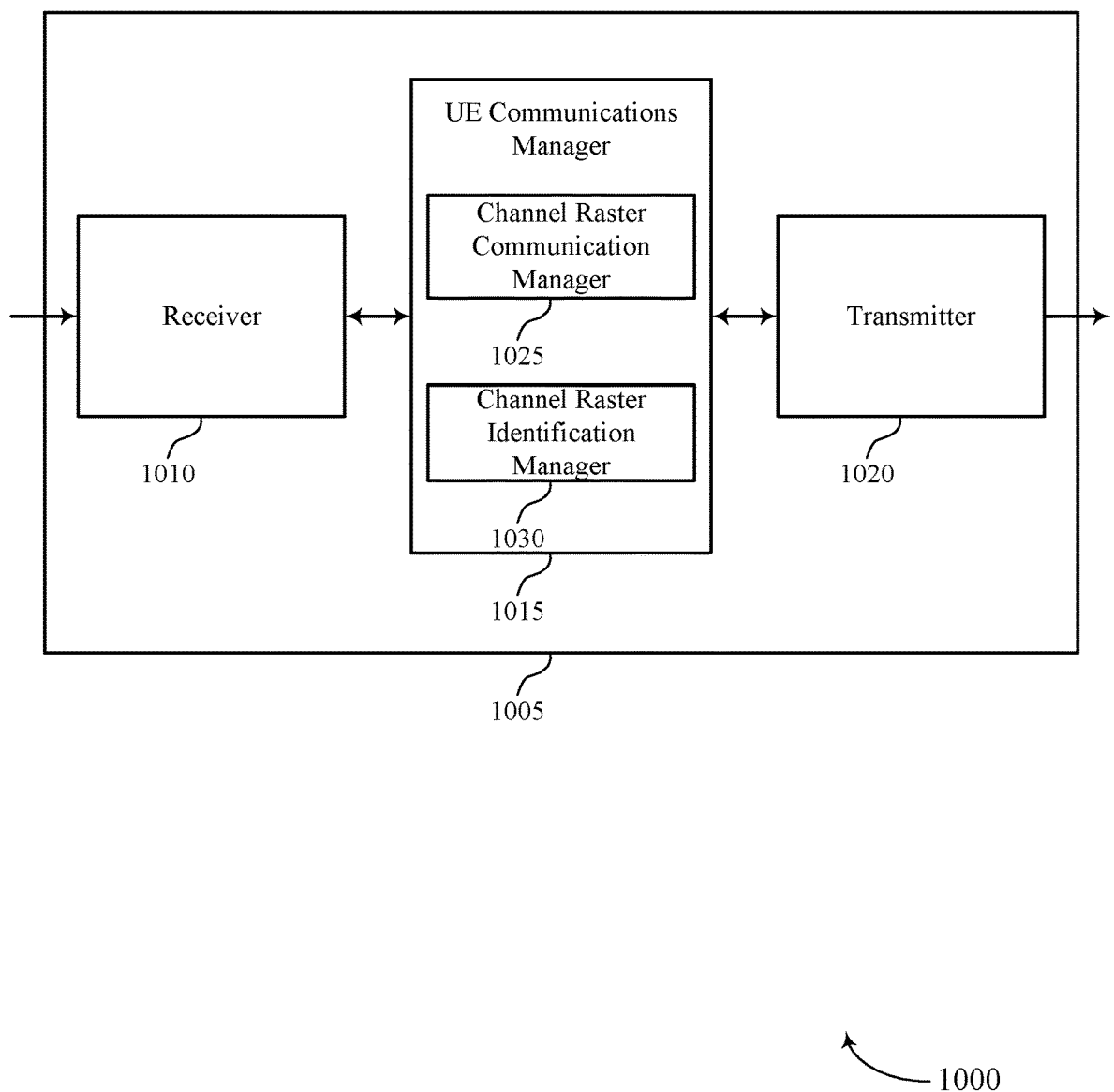

FIG. 10 shows a block diagram 1000 of a wireless device 1005 that supports channel and sync raster signaling in accordance with aspects of the present disclosure. Wireless device 1005 may be an example of aspects of a wireless device 905 or a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to channel and sync raster signaling, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 may also include channel raster communication manager 1025 and channel raster identification manager 1030.

Channel raster communication manager 1025 may receive a message that includes an indication of a resource block offset metric. In some cases, the message includes at least one of a broadcast message, a UE specific message, or combinations thereof.

Channel raster identification manager 1030 may identify, based on the resource block offset metric, a channel raster associated with a set of resource blocks of a channel, the set of resource blocks having an asymmetric relation with respect to the channel raster.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
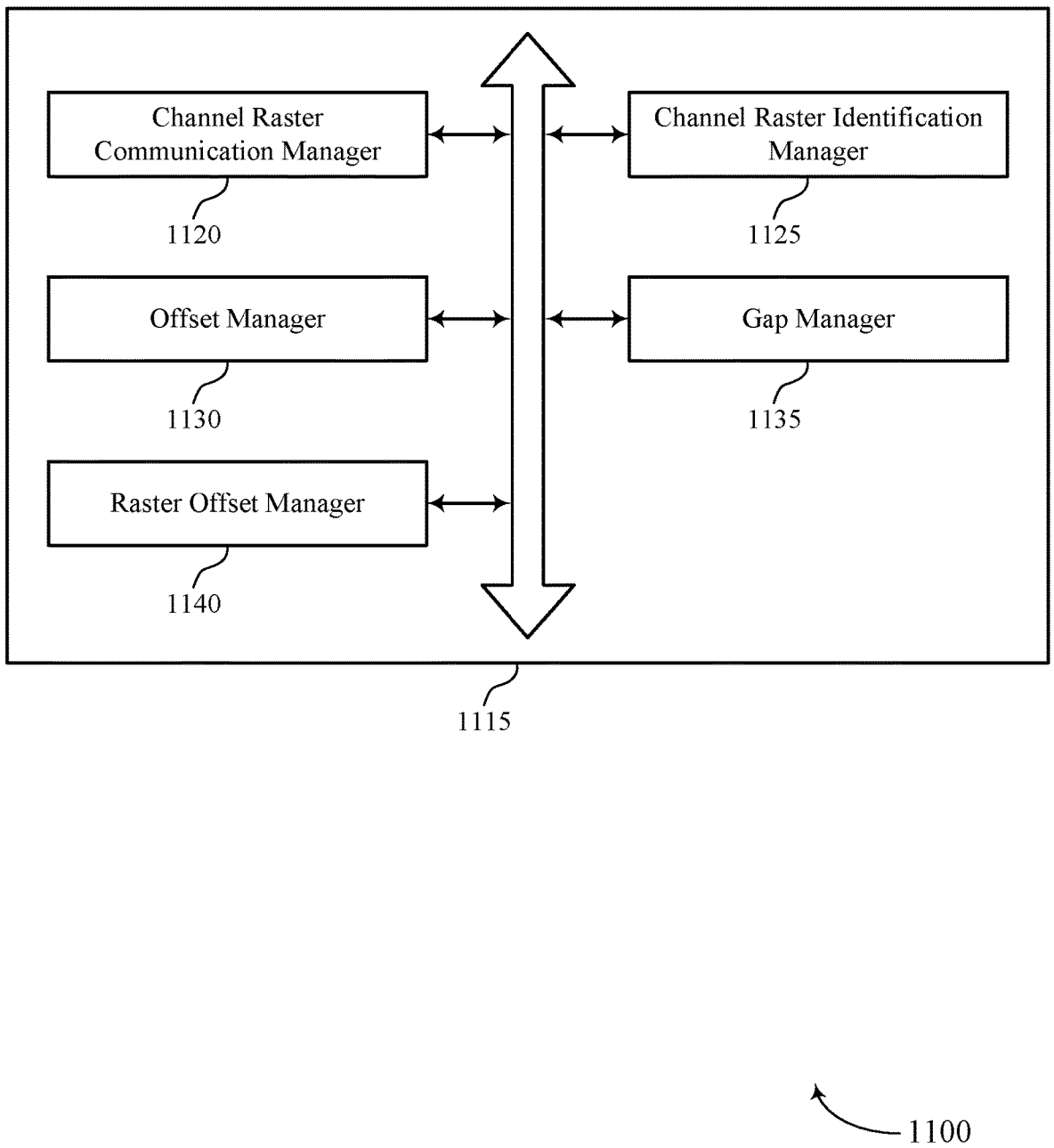

FIG. 11 shows a block diagram 1100 of a UE communications manager 1115 that supports channel and sync raster signaling in accordance with aspects of the present disclosure. The UE communications manager 1115 may be an example of aspects of a UE communications manager 1215 described with reference to FIGS. 9, 10, and 12. The UE communications manager 1115 may include channel raster communication manager 1120, channel raster identification manager 1125, offset manager 1130, gap manager 1135, and raster offset manager 1140. Each of these modules may communicate, directly or indirectly, with one another (e.g., via one or more buses).

Channel raster communication manager 1120 may receive a message that includes an indication of a resource block offset metric. In some cases, the message includes at least one of a broadcast message, a UE specific message, or combinations thereof.

Channel raster identification manager 1125 may identify, based on the resource block offset metric, a channel raster associated with a set of resource blocks of a channel, the set of resource blocks having an asymmetric relation with respect to the channel raster.

Offset manager 1130 may identify, based on the asymmetric relation, an offset distance between the first resource block and the channel raster, where the resource block offset metric includes the offset distance. Offset manager 1130 may identify, based on the asymmetric relation, a frequency associated with the first resource block, where the resource block offset metric includes the frequency. Offset manager 1130 may identify, based on the asymmetric relation, a resource block count associated with the set of resource blocks, where the resource block offset metric includes the resource block count. In some cases, the offset distance includes at least one of a frequency offset or a resource block count offset.

Gap manager 1135 may determine, based on the message, that there are one or more unused resource blocks in the set of resource blocks and identify, based on the message, a location parameter associated with the one or more unused resource blocks. In some cases, the location parameter includes at least one of an identifier associated with the one or more unused resource blocks, the first resource block and a resource block count associated with contiguous resource blocks, or combinations thereof. In some cases, each of the one or more unused resource blocks include a resource block with a predetermined number of unallocated resource elements.

Raster offset manager 1140 may identify, based on the message, a synchronization raster offset between a first channel and a second channel of a band, the first channel and the second channel sharing a common resource block grid. Raster offset manager 1140 may monitor for a synchronization signal on each resource block entry of the common resource block grid that is between the synchronization raster offset. Raster offset manager 1140 may monitor for a synchronization signal on each channel raster entry that is between two entries that are on the common resource block grid. In some cases, the synchronization raster offset includes a 900 KHz raster offset.

Figure 12:
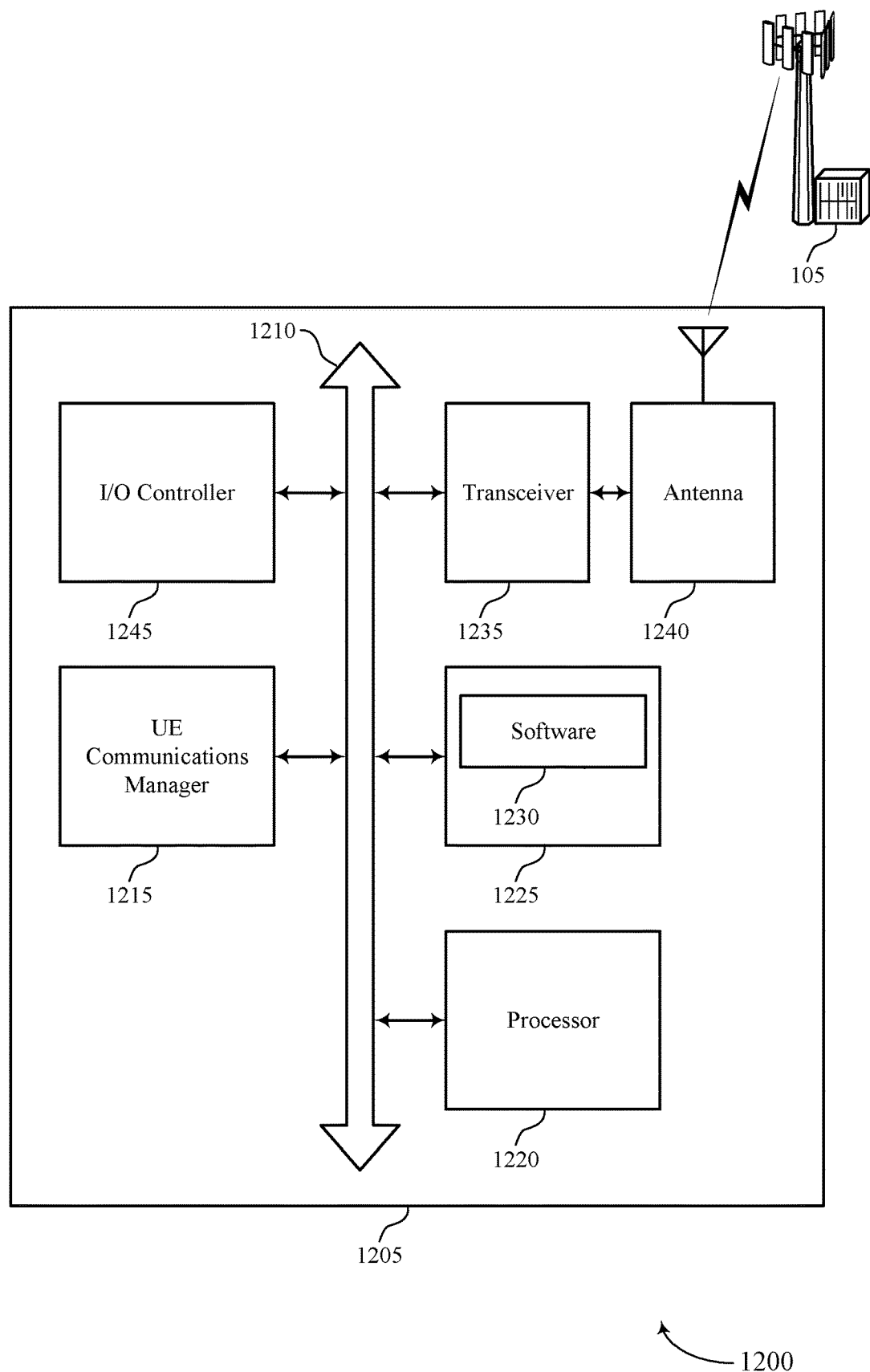
FIG. 12 illustrates a block diagram of a system including a user equipment (UE) that supports channel and sync raster signaling in accordance with aspects of the present disclosure.

FIG. 12 shows a diagram of a system 1200 including a device 1205 that supports channel and sync raster signaling in accordance with aspects of the present disclosure. Device 1205 may be an example of or include the components of UE 115 as described herein. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting channel and sync raster signaling).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support channel and sync raster signaling. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
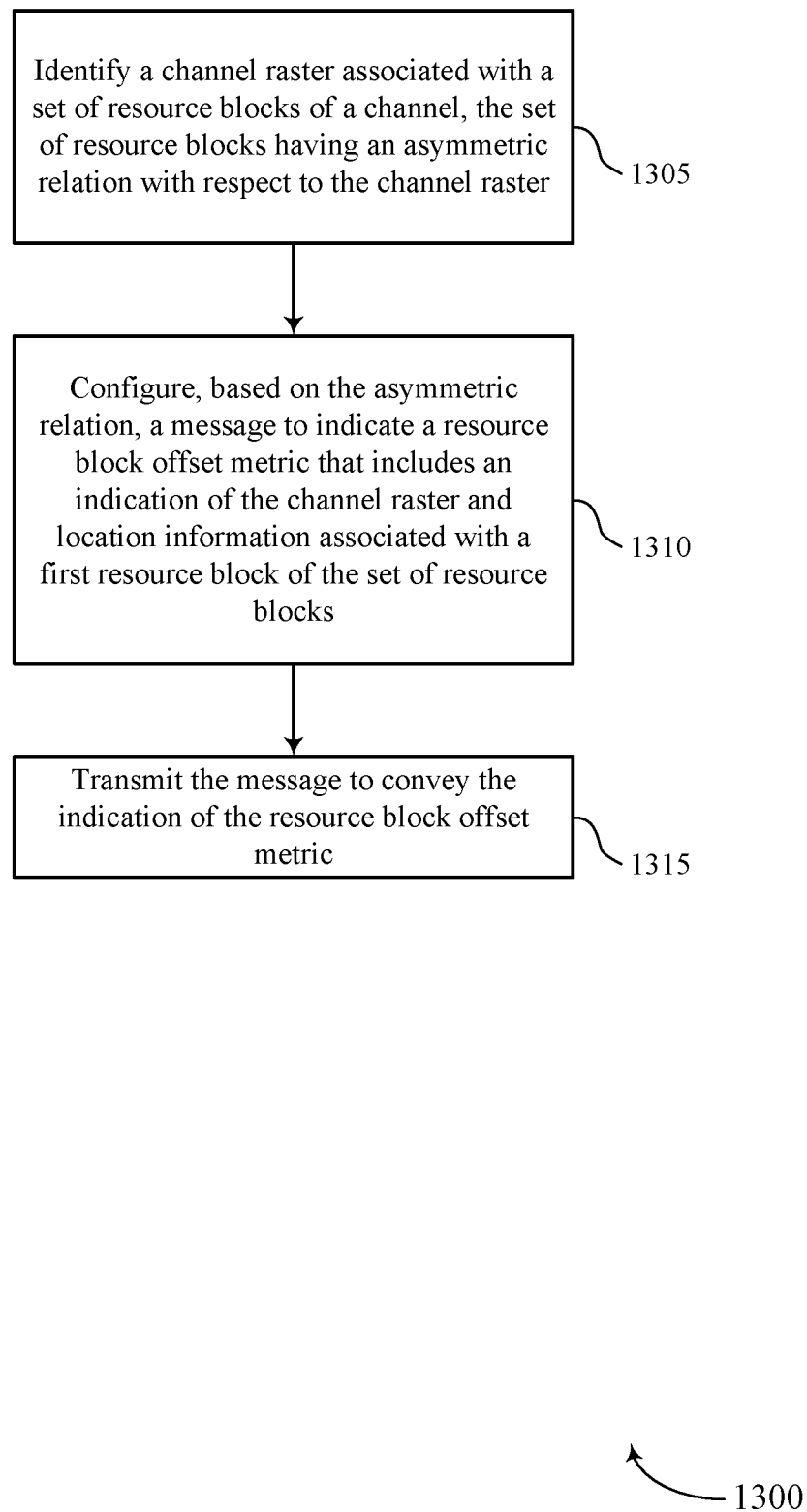
FIGS. 13 through 16 illustrate methods for channel and sync raster signaling in accordance with aspects of the present disclosure.

FIG. 13 shows a flowchart illustrating a method 1300 for channel and sync raster signaling in accordance with aspects of the present disclosure. The operations of method 1300 may be implemented by a base station 105 or its components as described herein. For example, the operations of method 1300 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify a channel raster associated with a plurality of resource blocks of a channel, the plurality of resource blocks having an asymmetric relation with respect to the channel raster. The operations of block 1305 may be performed according to the methods described herein. In certain examples, aspects of the operations of block 1305 may be performed by a channel raster identification manager as described with reference to FIGS. 5 through 8.

At block 1310 the base station 105 may configure, based at least in part on the asymmetric relation, a message to indicate a resource block offset metric that comprises an indication of the channel raster and location information associated with a first resource block of the plurality of resource blocks. The operations of block 1310 may be performed according to the methods described herein. In certain examples, aspects of the operations of block 1310 may be performed by a channel raster indication manager as described with reference to FIGS. 5 through 8.

At block 1315 the base station 105 may transmit the message to convey the indication of the resource block offset metric. The operations of block 1315 may be performed according to the methods described herein. In certain examples, aspects of the operations of block 1315 may be performed by a channel raster communication manager as described with reference to FIGS. 5 through 8.

Figure 14:
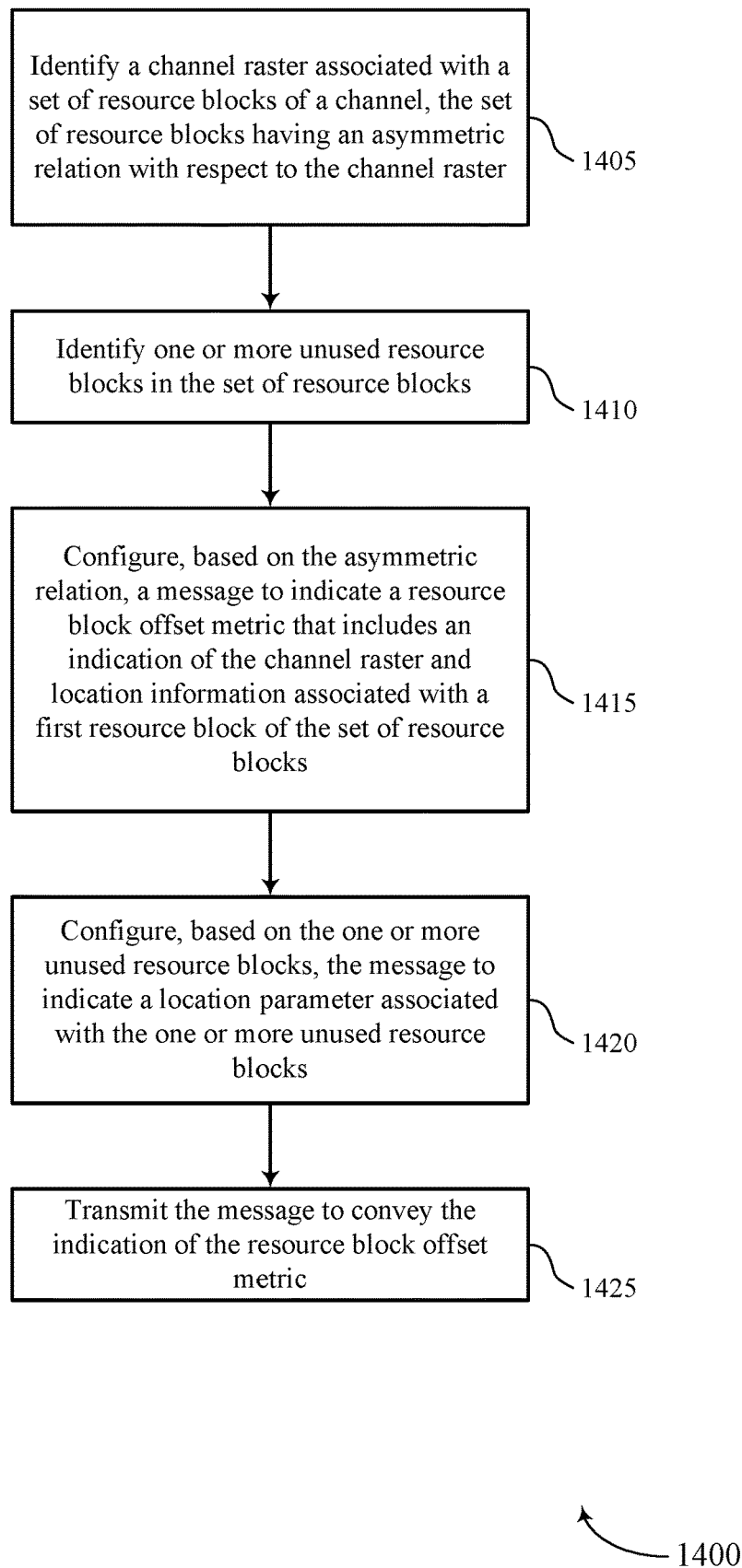

FIG. 14 shows a flowchart illustrating a method 1400 for channel and sync raster signaling in accordance with aspects of the present disclosure. The operations of method 1400 may be implemented by a base station 105 or its components as described herein. For example, the operations of method 1400 may be performed by a base station communications manager as described with reference to FIGS. 5 through 8. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify a channel raster associated with a plurality of resource blocks of a channel, the plurality of resource blocks having an asymmetric relation with respect to the channel raster. The operations of block 1405 may be performed according to the methods described herein. In certain examples, aspects of the operations of block 1405 may be performed by a channel raster identification manager as described with reference to FIGS. 5 through 8.

At block 1410 the base station 105 may identify one or more unused resource blocks in the plurality of resource blocks. The operations of block 1410 may be performed according to the methods described herein. In certain examples, aspects of the operations of block 1410 may be performed by a gap manager as described with reference to FIGS. 5 through 8.

At block 1415 the base station 105 may configure, based at least in part on the asymmetric relation, a message to indicate a resource block offset metric that comprises an indication of the channel raster and location information associated with a first resource block of the plurality of resource blocks. The operations of block 1415 may be performed according to the methods described herein. In certain examples, aspects of the operations of block 1415 may be performed by a channel raster indication manager as described with reference to FIGS. 5 through 8.

At block 1420 the base station 105 may configure, based at least in part on the one or more unused resource blocks, the message to indicate a location parameter associated with the one or more unused resource blocks. The operations of block 1420 may be performed according to the methods described herein. In certain examples, aspects of the operations of block 1420 may be performed by a gap manager as described with reference to FIGS. 5 through 8.

At block 1425 the base station 105 may transmit the message to convey the indication of the resource block offset metric. The operations of block 1425 may be performed according to the methods described herein. In certain examples, aspects of the operations of block 1425 may be performed by a channel raster communication manager as described with reference to FIGS. 5 through 8.

Figure 15:
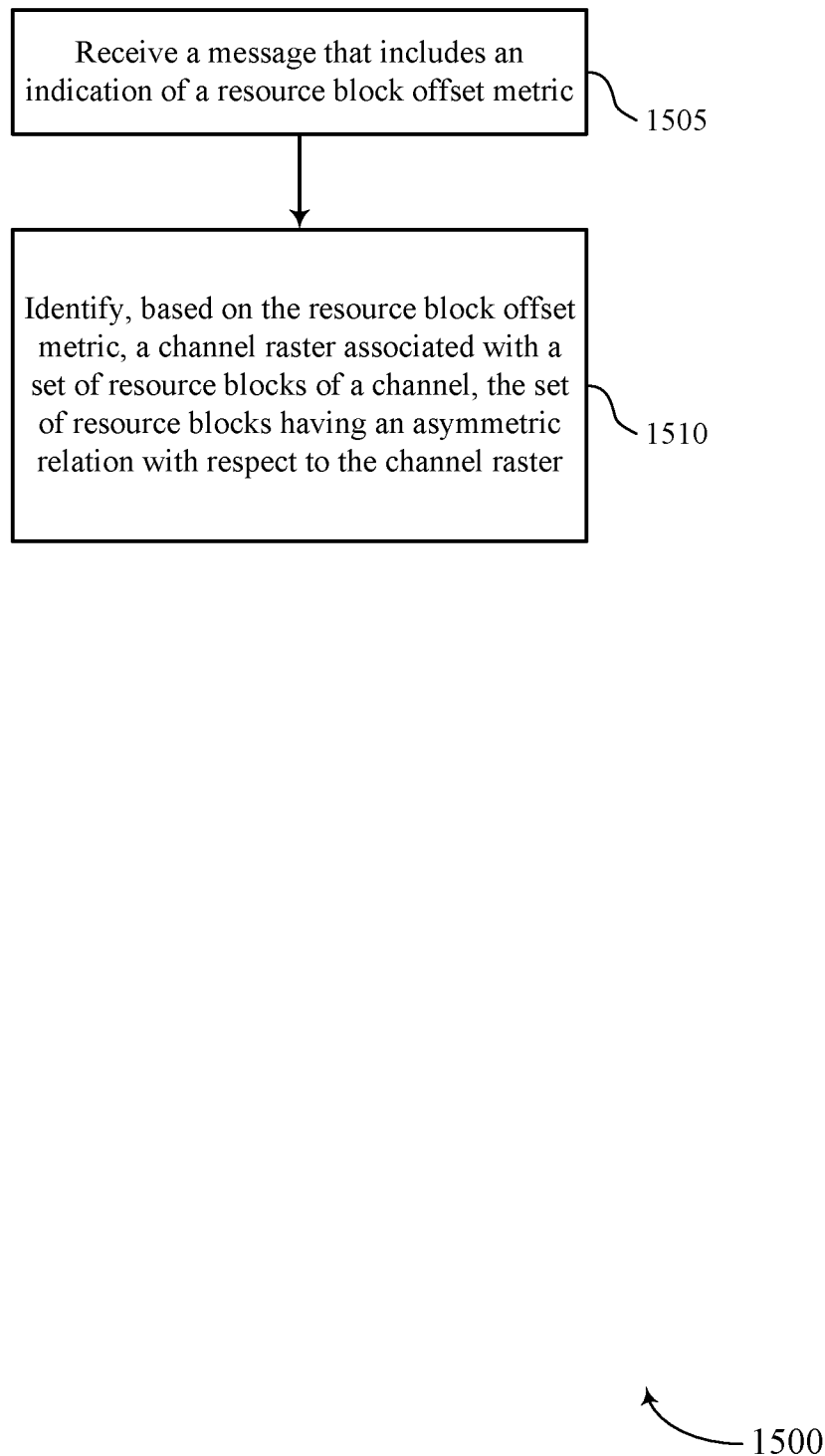

FIG. 15 shows a flowchart illustrating a method 1500 for channel and sync raster signaling in accordance with aspects of the present disclosure. The operations of method 1500 may be implemented by a UE 115 or its components as described herein. For example, the operations of method 1500 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive a message that comprises an indication of a resource block offset metric. The operations of block 1505 may be performed according to the methods described herein. In certain examples, aspects of the operations of block 1505 may be performed by a channel raster communication manager as described with reference to FIGS. 9 through 12.

At block 1510 the UE 115 may identify, based at least in part on the resource block offset metric, a channel raster associated with a plurality of resource blocks of a channel, the plurality of resource blocks having an asymmetric relation with respect to the channel raster. The operations of block 1510 may be performed according to the methods described herein. In certain examples, aspects of the operations of block 1510 may be performed by a channel raster identification manager as described with reference to FIGS. 9 through 12.

Figure 16:
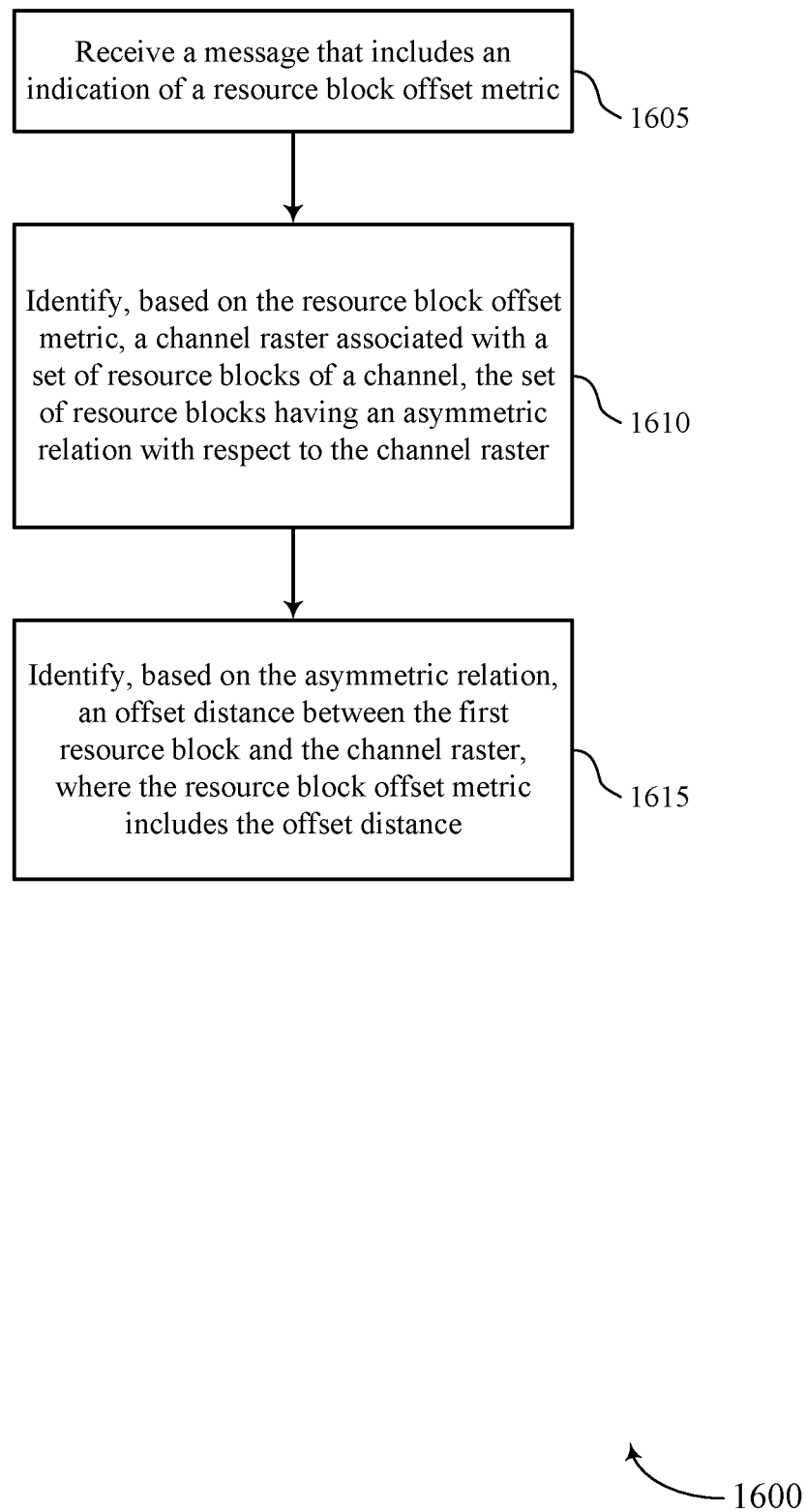

FIG. 16 shows a flowchart illustrating a method 1600 for channel and sync raster signaling in accordance with aspects of the present disclosure. The operations of method 1600 may be implemented by a UE 115 or its components as described herein. For example, the operations of method 1600 may be performed by a UE communications manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a message that comprises an indication of a resource block offset metric. The operations of block 1605 may be performed according to the methods described herein. In certain examples, aspects of the operations of block 1605 may be performed by a channel raster communication manager as described with reference to FIGS. 9 through 12.

At block 1610 the UE 115 may identify, based at least in part on the resource block offset metric, a channel raster associated with a plurality of resource blocks of a channel, the plurality of resource blocks having an asymmetric relation with respect to the channel raster. The operations of block 1610 may be performed according to the methods described herein. In certain examples, aspects of the operations of block 1610 may be performed by a channel raster identification manager as described with reference to FIGS. 9 through 12.

At block 1615 the UE 115 may identify, based at least in part on the asymmetric relation, an offset distance between the first resource block and the channel raster, wherein the resource block offset metric comprises the offset distance. The operations of block 1615 may be performed according to the methods described herein. In certain examples, aspects of the operations of block 1615 may be performed by a offset manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying a channel raster associated with a plurality of resource blocks of a channel, the plurality of resource blocks having an asymmetric relation with respect to the channel raster; and
transmitting, based at least in part on the asymmetric relation, a message to indicate a resource block offset metric that comprises an indication of the channel raster and location information associated with a first resource block of the plurality of resource blocks.

2. The method of claim 1, wherein:
the channel is associated with at least one of an uplink channel, a downlink channel, or combinations thereof.

3. The method of claim 1, wherein:
the message comprises at least one of a broadcast message, a user equipment (UE) specific message, or combinations thereof.

4. The method of claim 1, further comprising:
identifying, based at least in part on the asymmetric relation, an offset distance between the first resource block and the channel raster, wherein the location information comprises the offset distance.

5. The method of claim 4, wherein:
the offset distance comprises at least one of a frequency offset or a resource block count offset.

6. The method of claim 1, further comprising:
identifying, based at least in part on the asymmetric relation, a frequency associated with the first resource block, wherein the location information comprises the frequency.

7. The method of claim 6, further comprising:
identifying, based at least in part on the asymmetric relation, a resource block count associated with the plurality of resource blocks, wherein the location information comprises the resource block count.

8. The method of claim 1, further comprising:
identifying a user equipment (UE) capability; and
identifying the channel raster based at least in part on the UE capability.

9. The method of claim 8, further comprising:
selecting, based at least in part on the UE capability, a signaling scheme to convey the indication of the resource block offset metric.

10. The method of claim 1, further comprising:
identifying one or more unused resource blocks in the plurality of resource blocks; and
configuring, based at least in part on the one or more unused resource blocks, the message to indicate a location parameter associated with the one or more unused resource blocks.

11. The method of claim 10, wherein:
the location parameter comprises at least one of an identifier associated with the one or more unused resource blocks, the first resource block and a resource block count associated with contiguous resource blocks, or combinations thereof.

12. The method of claim 10, wherein:
each of the one or more unused resource blocks comprise a resource block with a predetermined number of unallocated resource elements.

13. The method of claim 1, further comprising:
identifying a synchronization raster offset between a first channel and a second channel of a band, the first channel and the second channel sharing a common resource block grid; and transmitting a synchronization signal on each resource block entry of the common resource block grid that is between the synchronization raster offset.

14. The method of claim 13, wherein:
the synchronization raster offset comprises a 900 KHz raster offset and each resource block entry is located at 100 KHz increments.

15. The method of claim 1, further comprising:
identifying a synchronization raster offset between a first channel and a second channel of a band, the first channel and the second channel sharing a common resource block grid; and
transmitting a synchronization signal on each channel raster entry that is between two entries that are on the common resource block grid.

16. A method for wireless communication, comprising:
receiving a message that comprises an indication of a resource block offset metric; and
identifying, based at least in part on the resource block offset metric, a channel raster associated with a plurality of resource blocks of a channel, the plurality of resource blocks having an asymmetric relation with respect to the channel raster.

17. The method of claim 16, wherein:
the message comprises at least one of a broadcast message, a user equipment (UE) specific message, or combinations thereof.

18. The method of claim 16, further comprising:
identifying, based at least in part on the asymmetric relation, an offset distance between a first resource block and the channel raster, wherein the resource block offset metric comprises the offset distance.

19. The method of claim 18, wherein:
the offset distance comprises at least one of a frequency offset or a resource block count offset.

20. The method of claim 16, further comprising:
identifying, based at least in part on the asymmetric relation, a frequency associated with a first resource block, wherein the resource block offset metric comprises the frequency.

21. The method of claim 20, further comprising:
identifying, based at least in part on the asymmetric relation, a resource block count associated with the plurality of resource blocks, wherein the resource block offset metric comprises the resource block count.

22. The method of claim 16, further comprising:
determining, based at least in part on the message, that there are one or more unused resource blocks in the plurality of resource blocks; and
identifying, based at least in part on the message, a location parameter associated with the one or more unused resource blocks.

23. The method of claim 22, wherein:
the location parameter comprises at least one of an identifier associated with the one or more unused resource blocks, a first resource block and a resource block count associated with contiguous resource blocks, or combinations thereof.

24. The method of claim 22, wherein:
each of the one or more unused resource blocks comprise a resource block with a predetermined number of unallocated resource elements.

25. The method of claim 16, further comprising:
identifying, based at least in part on the message, a synchronization raster offset between a first channel and a second channel of a band, the first channel and the second channel sharing a common resource block grid; and
monitoring for a synchronization signal on each resource block entry of the common resource block grid that is between the synchronization raster offset.

26. The method of claim 25, wherein:
the synchronization raster offset comprises a 900 KHz raster offset.

27. The method of claim 16, further comprising:
identifying, based at least in part on the message, a synchronization raster offset between a first channel and a second channel of a band, the first channel and the second channel sharing a common resource block grid; and
monitoring for a synchronization signal on each channel raster entry that is between two entries that are on the common resource block grid.

28. An apparatus for wireless communication, comprising:
a processor;
memory in electronic communication with the processor; and
instructions stored in the memory and operable, when executed by the processor, to cause the apparatus to:
identify a channel raster associated with a plurality of resource blocks of a channel, the plurality of resource blocks having an asymmetric relation with respect to the channel raster; and
transmit, based at least in part on the asymmetric relation, a message to indicate a resource block offset metric that comprises an indication of the channel raster and location information associated with a first resource block of the plurality of resource blocks.

29. The apparatus of claim 28, wherein:
the channel is associated with at least one of an uplink channel, a downlink channel, or combinations thereof.

30. The apparatus of claim 28, wherein:
the message comprises at least one of a broadcast message, a user equipment (UE) specific message, or combinations thereof.

31. The apparatus of claim 28, wherein the instructions are further executable by the processor to:
identify, based at least in part on the asymmetric relation, an offset distance between the first resource block and the channel raster, wherein the location information comprises the offset distance.

32. The apparatus of claim 31, wherein:
the offset distance comprises at least one of a frequency offset or a resource block count offset.

33. The apparatus of claim 28, wherein the instructions are further executable by the processor to:
identify, based at least in part on the asymmetric relation, a frequency associated with the first resource block, wherein the location information comprises the frequency.

34. The apparatus of claim 33, wherein the instructions are further executable by the processor to:
identify, based at least in part on the asymmetric relation, a resource block count associated with the plurality of resource blocks, wherein the location information comprises the resource block count.

35. The apparatus of claim 28, wherein the instructions are further executable by the processor to:
identify a user equipment (UE) capability; and
identify the channel raster based at least in part on the UE capability.

36. The apparatus of claim 35, wherein the instructions are further executable by the processor to:
  select, based at least in part on the UE capability, a signaling scheme to convey the indication of the resource block offset metric.

37. The apparatus of claim 28, wherein the instructions are further executable by the processor to:
  identify one or more unused resource blocks in the plurality of resource blocks; and
  configure, based at least in part on the one or more unused resource blocks, the message to indicate a location parameter associated with the one or more unused resource blocks.

38. The apparatus of claim 37, wherein:
  the location parameter comprises at least one of an identifier associated with the one or more unused resource blocks, the first resource block and a resource block count associated with contiguous resource blocks, or combinations thereof.

39. The apparatus of claim 37, wherein:
  each of the one or more unused resource blocks comprise a resource block with a predetermined number of unallocated resource elements.

40. The apparatus of claim 28, wherein the instructions are further executable by the processor to:
  identify a synchronization raster offset between a first channel and a second channel of a band, the first channel and the second channel sharing a common resource block grid; and
  transmit a synchronization signal on each resource block entry of the common resource block grid that is between the synchronization raster offset.

41. The apparatus of claim 40, wherein:
  the synchronization raster offset comprises a 900 KHz raster offset and each resource block entry is located at 100 KHz increments.

42. The apparatus of claim 28, wherein the instructions are further executable by the processor to:
  identify a synchronization raster offset between a first channel and a second channel of a band, the first channel and the second channel sharing a common resource block grid; and
  transmit a synchronization signal on each channel raster entry that is between two entries that are on the common resource block grid.

43. An apparatus for wireless communication, comprising:
  a processor;
  memory in electronic communication with the processor; and
  instructions stored in the memory and operable, when executed by the processor, to cause the apparatus to:
    receive a message that comprises an indication of a resource block offset metric; and
    identify, based at least in part on the resource block offset metric, a channel raster associated with a plurality of resource blocks of a channel, the plurality of resource blocks having an asymmetric relation with respect to the channel raster.

44. The apparatus of claim 43, wherein:
  the message comprises at least one of a broadcast message, a user equipment (UE) specific message, or combinations thereof.

45. The apparatus of claim 43, wherein the instructions are further executable by the processor to:
  identify, based at least in part on the asymmetric relation, an offset distance between a first resource block and the channel raster, wherein the resource block offset metric comprises the offset distance.

46. The apparatus of claim 45, wherein:
  the offset distance comprises at least one of a frequency offset or a resource block count offset.

47. The apparatus of claim 43, wherein the instructions are further executable by the processor to:
  identify, based at least in part on the asymmetric relation, a frequency associated with a first resource block, wherein the resource block offset metric comprises the frequency.

48. The apparatus of claim 47, wherein the instructions are further executable by the processor to:
  identify, based at least in part on the asymmetric relation, a resource block count associated with the plurality of resource blocks, wherein the resource block offset metric comprises the resource block count.

49. The apparatus of claim 43, wherein the instructions are further executable by the processor to:
  determine, based at least in part on the message, that there are one or more unused resource blocks in the plurality of resource blocks; and
  identify, based at least in part on the message, a location parameter associated with the one or more unused resource blocks.

50. The apparatus of claim 49, wherein:
  the location parameter comprises at least one of an identifier associated with the one or more unused resource blocks, a first resource block and a resource block count associated with contiguous resource blocks, or combinations thereof.

51. The apparatus of claim 49, wherein:
  each of the one or more unused resource blocks comprise a resource block with a predetermined number of unallocated resource elements.

52. The apparatus of claim 43, wherein the instructions are further executable by the processor to:
  identify, based at least in part on the message, a synchronization raster offset between a first channel and a second channel of a band, the first channel and the second channel sharing a common resource block grid; and
  monitor for a synchronization signal on each resource block entry of the common resource block grid that is between the synchronization raster offset.

53. The apparatus of claim 52, wherein:
  the synchronization raster offset comprises a 900 KHz raster offset.

54. The apparatus of claim 43, wherein the instructions are further executable by the processor to:
  identify, based at least in part on the message, a synchronization raster offset between a first channel and a second channel of a band, the first channel and the second channel sharing a common resource block grid; and
  monitor for a synchronization signal on each channel raster entry that is between two entries that are on the common resource block grid.

* * * * *